United States Patent
Elend et al.

(10) Patent No.: US 10,361,934 B2
(45) Date of Patent: Jul. 23, 2019

(54) CONTROLLER AREA NETWORK (CAN) DEVICE AND METHOD FOR CONTROLLING CAN TRAFFIC

(71) Applicant: NXP B.V., Eindhoven (NL)

(72) Inventors: Bernd Uwe Gerhard Elend, Hamburg (DE); Peter Michael Buehring, Hamburg (DE); Matthias Berthold Muth, Stelle (DE)

(73) Assignee: NXP B.V., Eindhoven (NL)

( * ) Notice: Subject to any disclaimer, the term of this patent is extended or adjusted under 35 U.S.C. 154(b) by 608 days.

(21) Appl. No.: 14/868,223

(22) Filed: Sep. 28, 2015

(65) Prior Publication Data
US 2017/0093659 A1    Mar. 30, 2017

(51) Int. Cl.
*H04L 12/26* (2006.01)
*H04L 29/08* (2006.01)
*H04L 12/40* (2006.01)
*H04L 29/06* (2006.01)

(52) U.S. Cl.
CPC ........ *H04L 43/08* (2013.01); *H04L 12/40045* (2013.01); *H04L 63/1416* (2013.01); *H04L 67/12* (2013.01); *H04L 2012/40215* (2013.01)

(58) Field of Classification Search
CPC ... H04L 43/08; H04L 12/40045; H04L 63/08; H04L 63/1416; H04L 63/1425; H04L 2012/40215; G05F 13/385
See application file for complete search history.

(56) References Cited

U.S. PATENT DOCUMENTS

| 5,958,029 A * | 9/1999 | McKinnon ............ G06F 13/385 710/100 |
| 6,041,039 A | 3/2000 | Kilkki et al. |

(Continued)

FOREIGN PATENT DOCUMENTS

| WO | 2014/115455 A1 | 7/2014 |
| WO | 2014/199687 A1 | 12/2014 |

OTHER PUBLICATIONS

Controller Area Networks for Vehicles (Apr. 2012) by Hugo Provencher, University of Ontario, Institute of Technology.*

(Continued)

*Primary Examiner* — Viet D Vu
(74) *Attorney, Agent, or Firm* — Rajeev Madnawat

(57) ABSTRACT

Embodiments of a device and method are disclosed. A controller area network (CAN) device includes a compare module configured to interface with a CAN transceiver, the compare module having a receive data (RXD) interface configured to receive data from the CAN transceiver, a CAN decoder configured to decode an identifier of a CAN message received from the RXD interface, and an identifier memory configured to store an entry that corresponds to at least one identifier, and compare logic configured to compare a received identifier from a CAN message to the entry that is stored in the identifier memory and to output a match signal when the comparison indicates that the received identifier of the CAN message matches the entry that is stored at the CAN device. The CAN device also includes a signal generator configured to output, in response to the match signal, a signal to invalidate the CAN message.

18 Claims, 22 Drawing Sheets

(56) References Cited

U.S. PATENT DOCUMENTS

| | | | |
|---|---|---|---|
| 6,496,885 B1* | 12/2002 | Smart | H04L 29/06 710/100 |
| 6,665,601 B1 | 12/2003 | Nielsen | |
| 7,274,699 B2* | 9/2007 | Allen | H04L 12/4135 370/392 |
| 7,983,820 B2 | 7/2011 | Kelly et al. | |
| 8,213,321 B2 | 7/2012 | Butts et al. | |
| 8,780,772 B2* | 7/2014 | Liu | H04L 1/1657 370/310 |
| 8,788,731 B2* | 7/2014 | Peirce | H04L 67/12 455/412.2 |
| 8,955,130 B1 | 2/2015 | Kalintsev et al. | |
| 9,231,936 B1* | 1/2016 | Wang | H04L 63/08 |
| 9,288,048 B2* | 3/2016 | Han | H04L 9/3242 |
| 9,380,070 B1* | 6/2016 | Cain | H04L 63/1416 |
| 9,705,678 B1* | 7/2017 | Wang | G06F 21/575 |
| 9,792,435 B2* | 10/2017 | Harris | G06N 99/005 |
| 2004/0153682 A1 | 8/2004 | Fuehrer et al. | |
| 2006/0171410 A1 | 8/2006 | Jung et al. | |
| 2007/0208470 A1 | 9/2007 | Itabashi et al. | |
| 2008/0159283 A1 | 7/2008 | Ishiyama et al. | |
| 2008/0274689 A1 | 11/2008 | Kuban | |
| 2010/0260102 A1* | 10/2010 | Liu | H04L 1/1657 370/328 |
| 2010/0306457 A1* | 12/2010 | Wilson | H04L 12/40013 711/104 |
| 2011/0022766 A1* | 1/2011 | Beckmann | H04L 12/40032 710/305 |
| 2012/0210154 A1 | 8/2012 | Hartwich | |
| 2012/0271975 A1 | 10/2012 | Elend | |
| 2013/0227648 A1* | 8/2013 | Ricci | G06F 3/0484 726/3 |
| 2013/0294460 A1 | 11/2013 | Hell | |
| 2014/0023068 A1* | 1/2014 | Kim | H04L 45/72 370/355 |
| 2014/0071995 A1* | 3/2014 | Hartwich | H04L 1/0002 370/468 |
| 2014/0156893 A1* | 6/2014 | Monroe | G06F 13/372 710/117 |
| 2014/0247122 A1 | 9/2014 | Moeller et al. | |
| 2014/0310530 A1* | 10/2014 | Oguma | H04L 9/3242 713/181 |
| 2014/0365693 A1 | 12/2014 | Monroe et al. | |
| 2015/0020152 A1 | 1/2015 | Litichever et al. | |
| 2015/0063120 A1 | 3/2015 | Horvath et al. | |
| 2015/0063371 A1 | 3/2015 | Horvath et al. | |
| 2015/0089236 A1* | 3/2015 | Han | H04L 9/3242 713/181 |
| 2015/0135271 A1* | 5/2015 | Forest | H04L 9/3226 726/4 |
| 2015/0172306 A1* | 6/2015 | Kim | H04L 63/1425 726/23 |
| 2015/0270968 A1* | 9/2015 | Nairn | H04L 9/32 713/181 |
| 2015/0358351 A1* | 12/2015 | Otsuka | H04L 12/4625 726/23 |
| 2016/0188396 A1 | 6/2016 | Sonalker et al. | |
| 2016/0286010 A1 | 9/2016 | Lennartsson | |
| 2016/0294578 A1 | 10/2016 | Maise et al. | |
| 2016/0294724 A1* | 10/2016 | Maise | H04L 47/801 |
| 2016/0297401 A1* | 10/2016 | Haga | B60R 25/307 |

OTHER PUBLICATIONS

Matsumoto, T. et al. "A Method of Preventing Unauthorized Data Transmission in Controller Area Network", IEEE 75th Vehicular Technology Conference (VTC Spring), Yokohama, Japan, 5 pgs. (2012).

Hata, M. et al. "Fusei Soshin Soshi: CAN dewa sore ga Kano de am = How to Stop Unauthorized Transmission in Controller Area Network", Computer Security Symposium, vol. 2011, No. 3, pp. 624-629 (Oct. 2011).

Lin, Chung-Wei et al.; "Cyber-Security for the Controller Area Network (CAN) Communication Protocol"; ISBN: 978-1-62561-001-0; p. 80-92; 2012.

EasySYNC Ltd, Application Note AN_103, CAN Plus Message Filtering; Document Reference No. ES-000037, ver. 1.01; 8 pgs. 2010.

"Road vehicles—Controller area network (CAN)—Part 1: Data link layer and physical signalling"; ISO 2014; 58 pgs.; 2014.

Jenkins, Michael et al.; "Security Needs for the Future Intelligent Vehicles"; SAE Tecnical Paper Series, Jan. 1426, 2006; 10 pgs.; 2006.

Notice of Allowance dated Mar. 15, 2018 for U.S. Appl. No. 14/868,252, 11 pages.

Extended European Serach Report, 16187896.2, dated Jan. 17, 2017.

Extended European Search Report, 16190655, dated Jan. 25, 2017.

* cited by examiner

CONTROLLER AREA NETWORK (CAN) DEVICE AND METHOD FOR CONTROLLING CAN TRAFFIC

BACKGROUND

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," is moving towards standardization in the form of an update of the existing ISO 11898-1 standard.

One growing concern with in-vehicle networks, such as in-vehicle networks that use the CAN bus protocol, is network security, including intrusion detection and intrusion prevention. For example, a compromised in-vehicle network could allow an attacker to maliciously control components of a vehicle.

SUMMARY

Embodiments of a device and method are disclosed. In an embodiment, a CAN device is disclosed. The CAN device includes a compare module configured to interface with a CAN transceiver, the compare module having a receive data (RXD) interface configured to receive data from the CAN transceiver, a CAN decoder configured to decode an identifier of a CAN message received from the RXD interface, and an identifier memory configured to store an entry that corresponds to at least one identifier, and compare logic configured to compare a received identifier from a CAN message to the entry that is stored in the identifier memory and to output a match signal when the comparison indicates that the received identifier of the CAN message matches the entry that is stored at the CAN device. The CAN device also includes a signal generator configured to output, in response to the match signal, a signal to invalidate the CAN message.

In an embodiment, the signal generator generates an error signal to invalidate the CAN message.

In an embodiment, the error signal is output onto a CAN bus to invalidate the CAN message.

In an embodiment, the identifier memory is configured to store one or more identifiers.

In an embodiment, the identifier memory is configured to store an identifier mask that corresponds to a group of identifiers.

In an embodiment, the compare logic is further configured to output the match signal when both the comparison indicates that the received identifier of the CAN message matches the entry that is stored at the CAN device and the CAN device is not currently transmitting a CAN message with the received identifier.

In an embodiment, the compare module further includes a transmit data (TXD) input interface configured to receive data from a CAN protocol controller and wherein the compare logic is further configured to populate the identifier memory with an identifier of a CAN message received at the TXD input interface. In an embodiment, an identifier is added to the identifier memory if the identifier is not already stored in the identifier memory.

In an embodiment, a transceiver integrated circuit device includes a receiver, a transmitter, a CAN bus interface, an RXD interface, a TXD interface, and the CAN device as described above.

In an embodiment, a microcontroller integrated circuit device includes a CAN protocol controller and the CAN device as described above.

In an embodiment, an integrated circuit device includes a CAN transceiver, a CAN protocol controller, and the CAN device as described above.

A method for controlling CAN traffic is also disclosed. The method involves receiving an identifier of a CAN message at a CAN device, the identifier received at the CAN device via a CAN bus, comparing the identifier of the CAN message to an entry in an identifier memory at the CAN device, outputting a match signal when the comparison indicates that the identifier from the CAN message matches the entry in the identifier memory, and invalidating the CAN message in response to the match signal.

In an embodiment, invalidating the CAN message comprises sending an error signal onto the CAN bus.

In an embodiment, invalidating the CAN message comprises notifying a CAN protocol controller to invalidate the CAN message at the CAN device.

In an embodiment, comparing the identifier of the CAN message with an entry in an identifier memory involves at least one of comparing the identifier to one or more stored identifiers or comparing the identifier memory to a mask that corresponds to a group of identifiers.

In an embodiment, the method involves identifying the identifier of a CAN message that is to be transmitted from the CAN device and storing the identifier in an identifier memory at the CAN device.

In an embodiment, the method involves an initial step of decoding an identifier of a CAN message from a TXD path and storing the decoded identifier in an identifier memory at the CAN device.

In an embodiment, the method involves adding an identifier to the identifier memory if the identifier is from a CAN message that is transmitted from the CAN device and the identifier is not already stored in the identifier memory.

In an embodiment, the identifier of the CAN message is compared with the entry in the identifier memory before the CAN message is provided to a CAN protocol controller.

Another embodiment of a CAN device is disclosed. The CAN device includes a CAN transceiver, a CAN protocol controller, and a compare module located in a signal path between the CAN transceiver and the CAN protocol controller. The compare module includes an RXD input interface configured to receive data from the CAN transceiver via a CAN bus, a CAN decoder configured to decode an identifier of a CAN message received from the RXD input interface, an identifier memory configured to store an entry that corresponds to at least one identifier, and compare logic configured to compare a received identifier from a CAN message with the entry that is stored in the identifier memory and to output a match signal when the comparison indicates that the received identifier of the CAN message matches the entry that is stored at the CAN device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
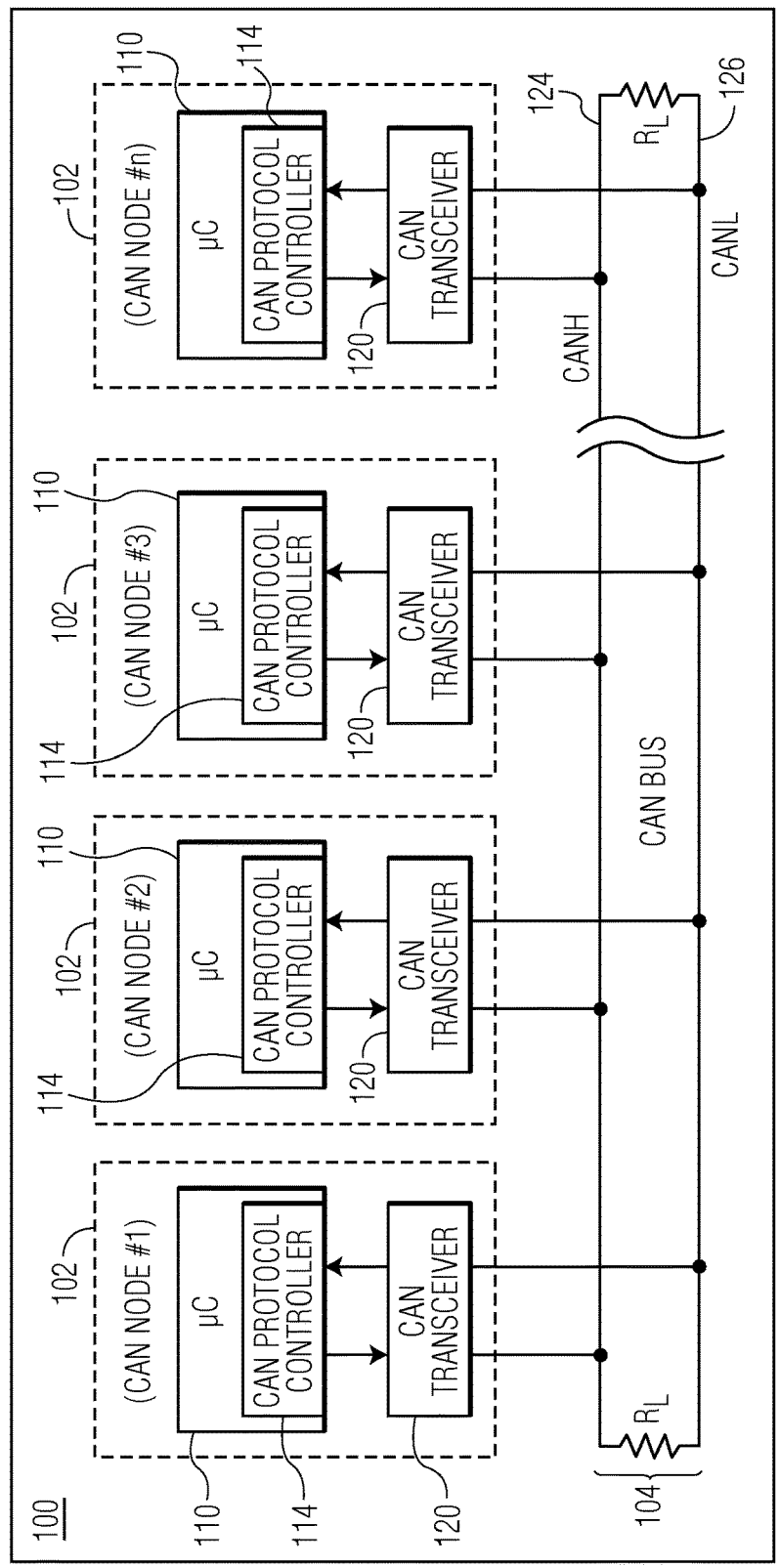
FIG. 1 depicts a CAN network that includes multiple CAN nodes connected to a CAN bus.

FIG. 1 depicts a CAN network 100 that includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an embodiment, the host supports application software that interacts with the CAN protocol controller.

The CAN protocol controllers 114, which can be embedded within the microcontrollers 110 or external to the microcontrollers (e.g., a separate IC device), implement data link layer operations as is known in the field. For example, in receive operations, a CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller 114 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
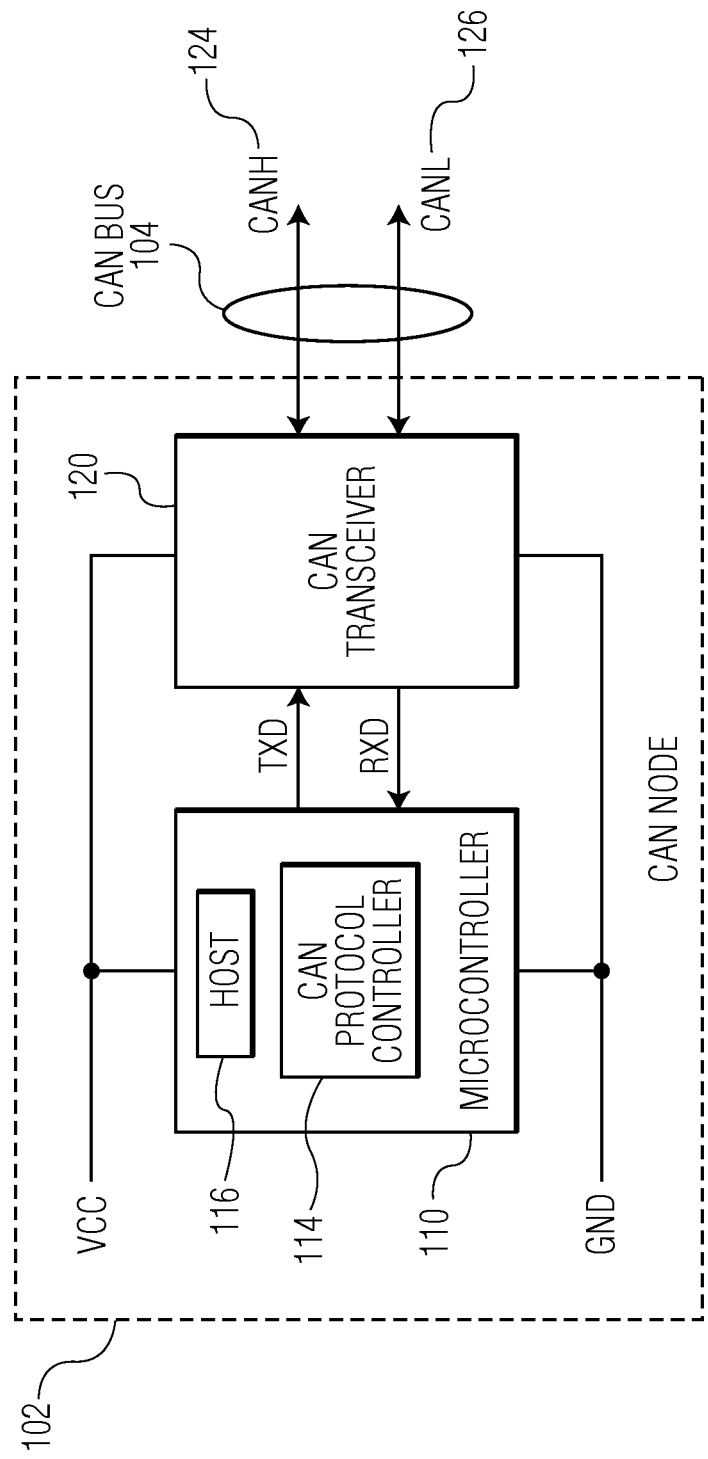
FIG. 2 depicts an expanded view of one CAN node from FIG. 1.

FIG. 2 depicts an expanded view of one CAN node 102 from FIG. 1. In the expanded view of FIG. 2, the microcontroller includes a host 116, which may be, for example, a software application that is stored in memory of the microcontroller and executed by processing circuits of the microcontroller. The microcontroller 110 and the CAN transceiver 120 of the CAN node are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Throughout the description, TXD is carried on a TXD path and RXD is carried on an RXD path. Data is communicated to and from the CAN bus via the CANH and CANL bus lines 124 and 126, respectively.

As noted above, the CAN protocol controller 114 can be configured to support the normal mode or the flexible data rate mode. As used herein, "CAN normal mode" (also referred to as "Classical CAN mode") refers to frames that are formatted according to the ISO 11898-1 standard and "CAN FD mode" refers to frames that are formatted according to the emerging ISO/Draft International Standard (DIS) 11898-1 standard, or an equivalent thereof.

Figure 3A:
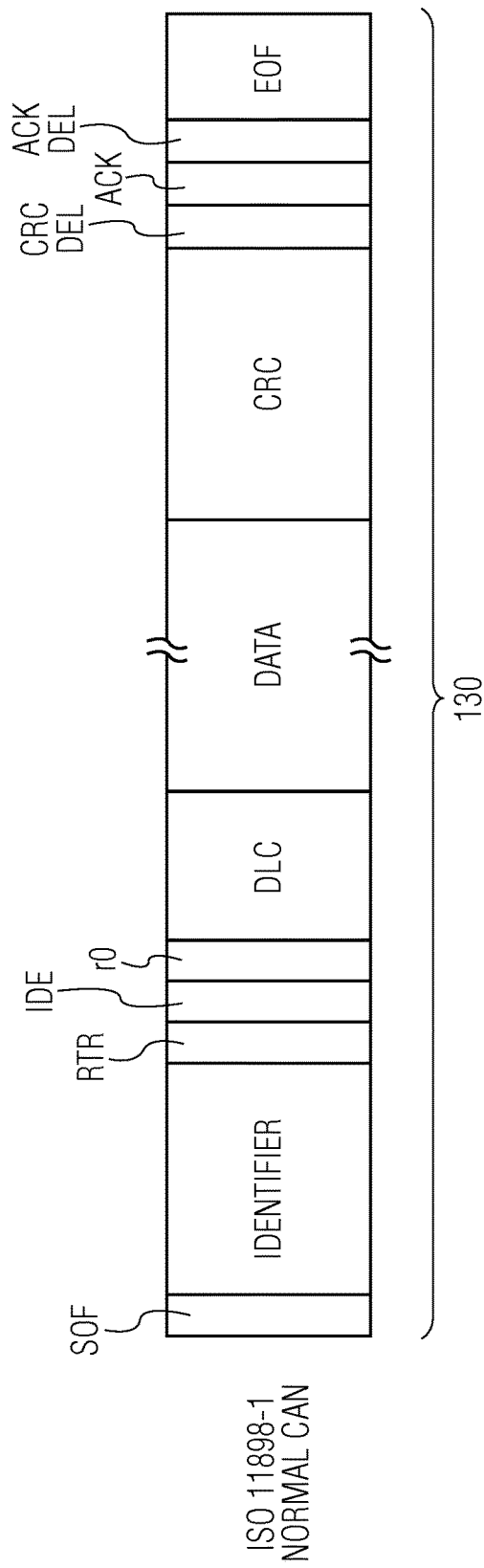
FIG. 3A depicts the format of an ISO 11898-1 frame that is used in CAN normal mode.
Figure 3B:
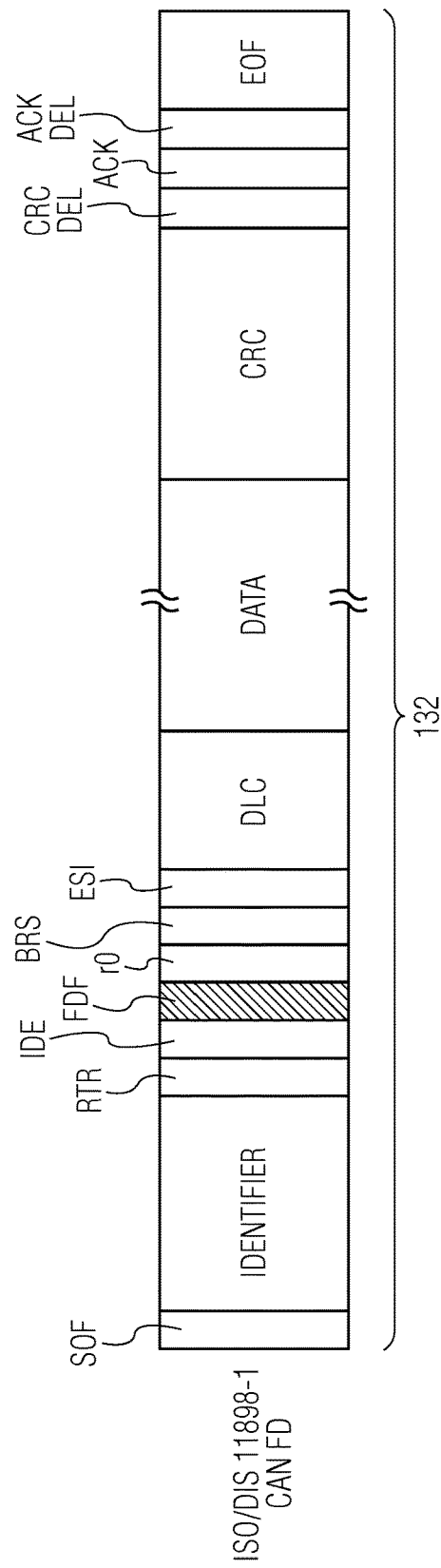
FIG. 3B depicts the format of an ISO 11898-1 frame that is used in CAN FD mode.

FIG. 3A depicts the format of an ISO 11898-1 frame 130 (in the classical base frame format (CBFF) or standard format) that is used in CAN normal mode and FIG. 3B depicts the format of an ISO/DIS 11898-1 frame 132 (in the FD base frame format or FBFF) that is used in CAN FD mode. The fields of the CAN normal mode and CAN FD mode frames are defined as follows:

| | |
|---|---|
| SOF | Start of Frame (always dominant) |
| IDENTIFIER | Identifier Bits, defining the message content |
| RTR | Remote transmission Request |
| IDE | ID Extension |
| r0 | Reserved Bit 0 (replaced by FDF in the CAN FD format) |
| FDF | FD Format (this is the bit distinguishing the frame formats) |

-continued

| | |
|---|---|
| BRS | Baud Rate Switch |
| ESI | Error State Indicator |
| DLC | Data Length Code |
| Data | Data Bytes |
| CRC | Cyclic Redundancy Check |
| CRC Del | CRC Delimiter (always recessive) |
| ACK | Acknowledge |
| ACK Del | Acknowledge Delimiter |
| EOF | End Of Frame |

There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame (ISO 11898-1) or a CAN FD mode frame (ISO/DIS 11898-1). When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

Figure 4A:
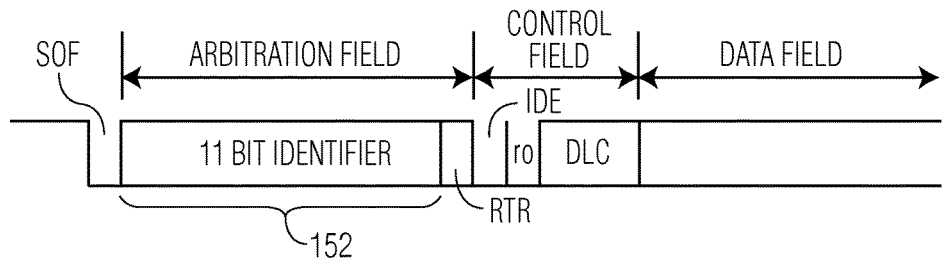
FIG. 4A depicts the IDENTIFIER field of a standard CAN frame.
Figure 4B:
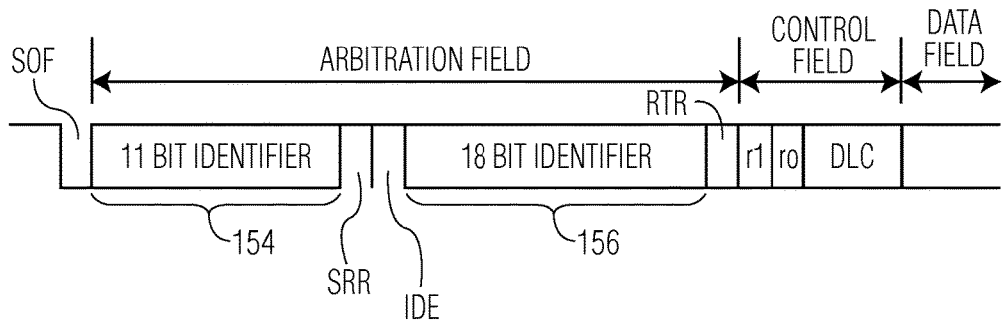
FIG. 4B depicts the IDENTIFIER field of an extended CAN frame.

CAN messages are broadcast messages and the identifier is unique to the sender CAN node. The CAN protocol controllers of the receiving CAN nodes have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The IDENTIFIER field 152 of a standard CAN frame is depicted in FIG. 4A and the IDENTIFIER field of an extended CAN frame is depicted in FIG. 4B. As shown in FIG. 4B, the 29-bit IDENTIFIER field is divided into two sections, an 11-bit base IDENTIFIER field 154 and an 18-bit extended IDENTIFIER field 156.

As stated above, security is a growing concern with in-vehicle networks. Many of the components of an in-vehicle network utilize software that must periodically be updated. In order to update software, in-vehicle networks often have "back door" access ports. If a back door access port is hacked, elements in the in-vehicle network can be compromised. One known attack technique on an in-vehicle network that uses the CAN protocol involves an attacker sending error flags to disturb frames that start with a certain identifier, which causes a sending CAN node to go into a "bus off" state. While the sending CAN node is recovering from the bus off state, the attacker can send CAN messages (e.g., "data frames", which are CAN frames with the RTR bit set to "0") with the identifier that is normally used by the sending CAN node. The suspicious CAN messages may be received by CAN nodes on the CAN bus and recognized as valid messages because the identifier has previously been used within the CAN network. Once received by a CAN node on the CAN bus, the suspicious messages can be used to implement malicious activity within the CAN node. To detect and prevent such an attack on the CAN network and in accordance with an embodiment of the invention, a CAN node can be configured to store the identifier of a CAN message that is being sent by the CAN node itself and further configured to compare the identifiers of incoming CAN messages to the stored identifier to determine if any incoming CAN messages have a matching identifier. Since identifiers are unique to each CAN node, if a received identifier matches a stored identifier, the receiving CAN node can assume that the CAN message is from an intruder and can take an action to prevent the intrusion. For example, in response to detecting a match between a received identifier and a stored identifier, the CAN node can be configured to immediately send an error signal such as an error flag onto the CAN bus to prevent the malicious CAN message from being successfully and completely received by any CAN nodes on the CAN bus, e.g., to invalidate, destroy, and/or kill the CAN message. Applying such a technique, only the original CAN node that uses a particular identifier can send CAN messages with that identifier without the CAN messages being invalidated, destroyed, and/or killed.

Using the above-described technique, a CAN node only needs to store the identifier of the CAN messages that are sent from that particular CAN node. That is, a CAN node only needs to store one entry, e.g., the identifier of the last CAN message that was sent from the CAN node and disturbed by an attacker. In another embodiment, a CAN node can be configured to store multiple different identifiers that have been sent from the respective CAN node, for example, all of the different identifiers that have been sent from the particular CAN node over time. Any CAN message that is received at the CAN node with a matching identifier, assuming that the CAN node itself is not transmitting the CAN message, can be invalidated by the CAN node by, for example, transmitting an error signal such as an error flag onto the CAN bus. In an embodiment, memory sufficient to store up to thirty-two different identifiers provides a good balance between flexibility and hardware resource needs (e.g., die space requirement). In another embodiment, the identifier memory is populated with at least one mask that corresponds to a group of identifiers. For example, the identifier memory includes a mask register that allows each bit of the mask register to be set to a "1," a "0," or a "don't care." The mask register can include enough bits to cover an entire identifier or only a portion of an identifier. In an embodiment that utilizes mask registers in the identifier memory, the mask registers can be programmable. In operation, an identifier from an incoming CAN message is compared with the mask and if the identifier matches the mask, a match signal is output. In an embodiment, the CAN messages of concern are CAN "data frames" as these are the CAN messages that carry payload data (e.g., in the DATA field). As is known in the field and described in the CAN protocol, CAN "data frames" are CAN frames with the RTR bit set to "0." On the other hand, CAN "remote frames" may not be of concern and may not be included in the identifier memory or checked for a match because CAN remote frames do not carry a payload (e.g., they do not include a DATA field). As is known in the field and described in the CAN protocol, CAN "remote frames" are CAN frames with the RTR bit set to "1."

Figure 5:
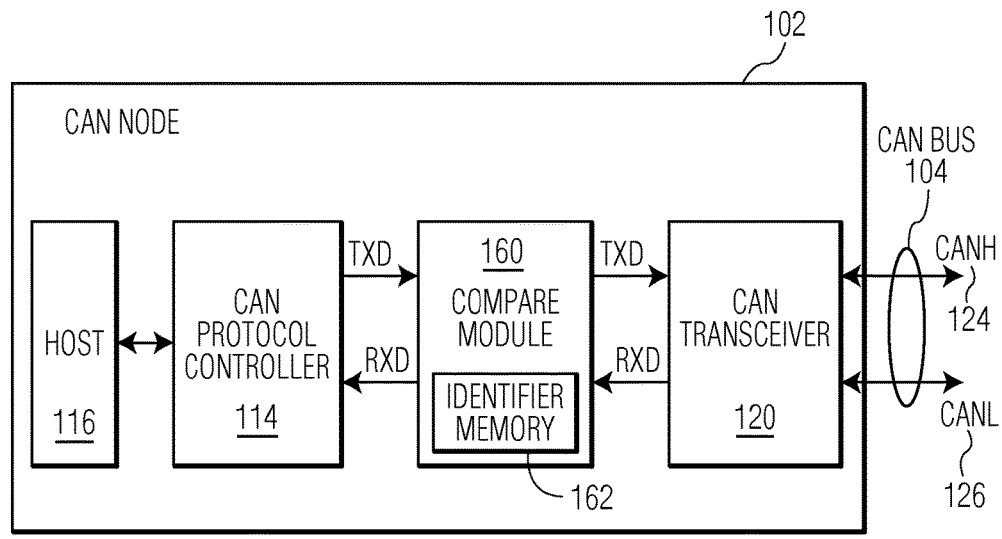
FIG. 5 depicts an embodiment of a CAN node that is configured to implement an intrusion detection/prevention technique.

FIG. 5 depicts an embodiment of a CAN node 102 that is configured to implement the above-described intrusion detection/prevention technique. The CAN node includes a CAN transceiver 120, a CAN protocol controller 114, and a host 116 as described above with reference to FIGS. 1 and 2 as well as a compare module 160 located in a data path between the CAN transceiver and the CAN protocol controller. The compare module includes an identifier memory 162 and is configured to decode an identifier of a CAN message that is received on the CAN bus 104 (e.g., CAN messages on the RXD path) and to compare the identifier of the CAN message to an entry (e.g., an identifier or a mask) that is stored in the identifier memory. As shown in FIG. 5, the compare module is located before the CAN protocol controller such that the comparison can take place before the CAN message is completely received at the CAN protocol controller and before any corresponding message is provided to the host. If the comparison indicates that the identifier from the CAN message matches the stored entry (e.g., the identifier or the mask) and assuming the CAN node is not transmitting the CAN message itself, a match signal is output from the compare module. In an embodiment, the match signal triggers the CAN device to invalidate, destroy, and/or kill the incoming CAN message before the corresponding message is provided to the host to prevent the CAN message from implementing any malicious activity within the CAN node itself and/or within other CAN nodes in the CAN network. In an embodiment, the compare module decodes outgoing CAN messages (e.g., CAN messages on the TXD path) and populates the identifier memory with the decoded identifiers. For example, the compare module adds to the identifier memory each identifier that has been successfully transmitted onto the CAN bus and that is not already stored in the identifier memory. In an embodiment, identifiers received on the TXD path are only stored in the identifier memory when the CAN protocol controller has not lost arbitration, e.g., the CAN protocol controller is still in transmit mode after the arbitration field. This is so because when the CAN protocol controller loses arbitration, subsequent bits of the identifier on the TXD path are all set to "1". In an embodiment, the compare module could be disconnected from the TXD path to exclude arbitration effects. In another embodiment, the compare logic is configured to confirm that the identifier received on the TXD path is the same as the identifier received on RXD path, e.g., an indication that arbitration was not lost.

Figure 6:
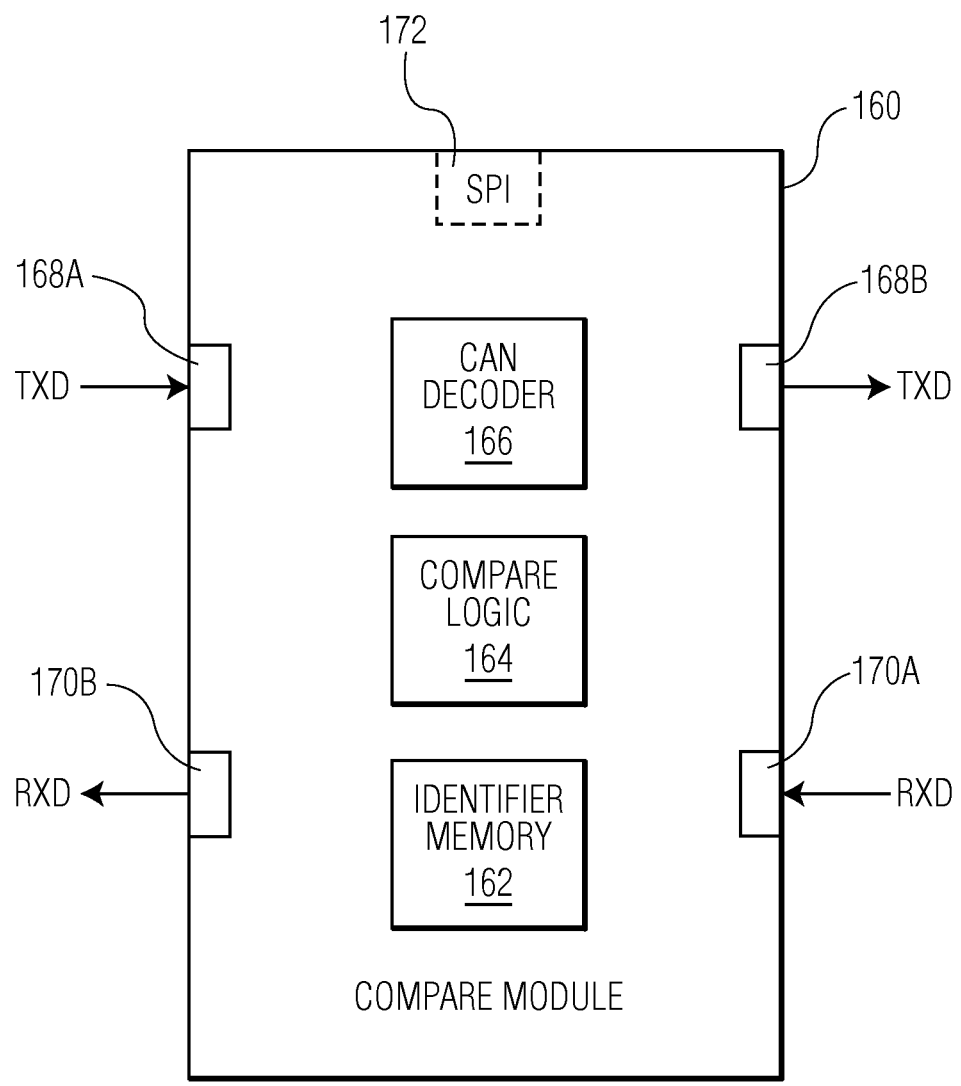
FIG. 6 depicts an embodiment of the compare module of FIG. 5.

FIG. 6 depicts an embodiment of the compare module 160 of FIG. 5. The compare module of FIG. 6 includes an identifier memory 162, compare logic 164, a CAN decoder 166, a TXD input interface 168A, a TXD output interface 168B, an RXD input interface 170A, and an RXD output interface 170B. The RXD input interface is configured to receive serial data from the RXD path and the TXD input interface is configured to receive serial data from the TXD path. The identifier memory may be configured to store an entry as an identifier in a manner that allows the identifier to be quickly searched. Multiple identifiers may also be stored in the identifier memory. The identifier memory may be configured to store an entry as a mask that allows a group of identifiers to be matched. Multiple masks may also be stored in the identifier memory. In an embodiment, the identifier memory is a content addressable memory (CAM) as is known in the field although other memory types are possible. In an embodiment, the identifier memory is write protected and is written to only one time, e.g., by the vehicle manufacturer. In one embodiment, the identifier memory is sized to store a single identifier and in other embodiments, the identifier memory is sized to store multiple identifiers, for example, up to thirty-two identifiers. The CAN decoder is configured to decode serial data (e.g., RXD and TXD) according to the CAN protocol and to parse out the identifier of a CAN message. The compare logic is configured to compare a received identifier from a CAN message with the stored identifier (or identifiers) in the identifier memory and to output a "match" signal when the comparison indicates that the received identifier of the CAN message matches the stored identifier. In an embodiment, the match signal triggers the CAN node to invalidate, destroy, and/or kill the CAN message before the CAN message is completely and successfully received at the CAN protocol controller. In one embodiment, the CAN device is configured to invalidate a suspicious CAN message on the CAN bus by sending an error signal such as an error flag onto the CAN bus. Sending an error signal such as an error flag onto the CAN bus will cause the suspicious CAN message to be invalidated by the other CAN nodes on the CAN bus, thereby protecting all of the CAN nodes on the CAN bus. In an embodiment, a CAN message can be invalidated with an error flag immediately after the identifier has been sent, or at any time later but before the EOF ends. In an embodiment, sending an error signal as a single dominant bit in the EOF would be sufficient to invalidate a CAN message on the CAN bus. Invalidating a CAN message in the EOF can be beneficial because the CRC has been processed and thus it can be assured that the wrong CAN message (with a corresponding identifier) has not been invalidated, e.g., due to a receive error in the identifier field. Invalidating a CAN message with a few bits, e.g., less than 6 bits which would make an error flag, might also be beneficial.

In an embodiment, the compare logic 164 of the compare module 160 is also configured to determine if the CAN node itself is transmitting a CAN message with the received identifier. For example, the compare logic may monitor the TXD input interface 168A or monitor a transmission status signal from the protocol controller 114. If the CAN node is actively transmitting a CAN message, then it is expected that the CAN transceiver 120 will also receive the same CAN message and the CAN decoder 166 of the compare module will receive the same identifier. Therefore, in an embodiment, the compare logic is configured to output a match signal only when there is a match between the received identifier and a stored identifier and when the CAN node is not actively transmitting a CAN message.

In an embodiment, the identifiers stored in the identifier memory are restricted to those identifiers that are supposed to be transmitted from the CAN device. In another embodiment, the identifiers stored in the identifier memory are restricted to those identifiers that actually have already been successfully transmitted on the CAN bus. In an embodiment, the identifier memory is automatically populated with those identifiers that have been successfully transmitted on the CAN bus.

In another embodiment, the identifier memory 162 of the compare module 160 may be populated directly from the host 116. For example, the compare module may include an alternate interface 172 (see FIG. 6), such as an SPI interface, that is used to receive identifiers directly from the host to populate the identifier memory. If the alternate interface is used to populate the identifier memory, the TXD input and TXD output interfaces on the compare module may not be needed. Additionally, although the compare module of FIG. 6 includes both an RXD input interface and an RXD output interface, the RXD output interface may not be needed depending on the implementation, e.g., how the compare module is connected to the RXD path. Likewise, although the compare module of FIG. 6 includes both a TXD input interface and a TXD output interface, the TXD output interface may not be needed depending on the implementation, e.g., how the compare module is connected to the TXD path. For example, as shown in the embodiment of FIG. 7, the RXD path and TXD path are spliced into the compare module via the RXD input interface and the TXD input interface, respectively.

Figure 7:
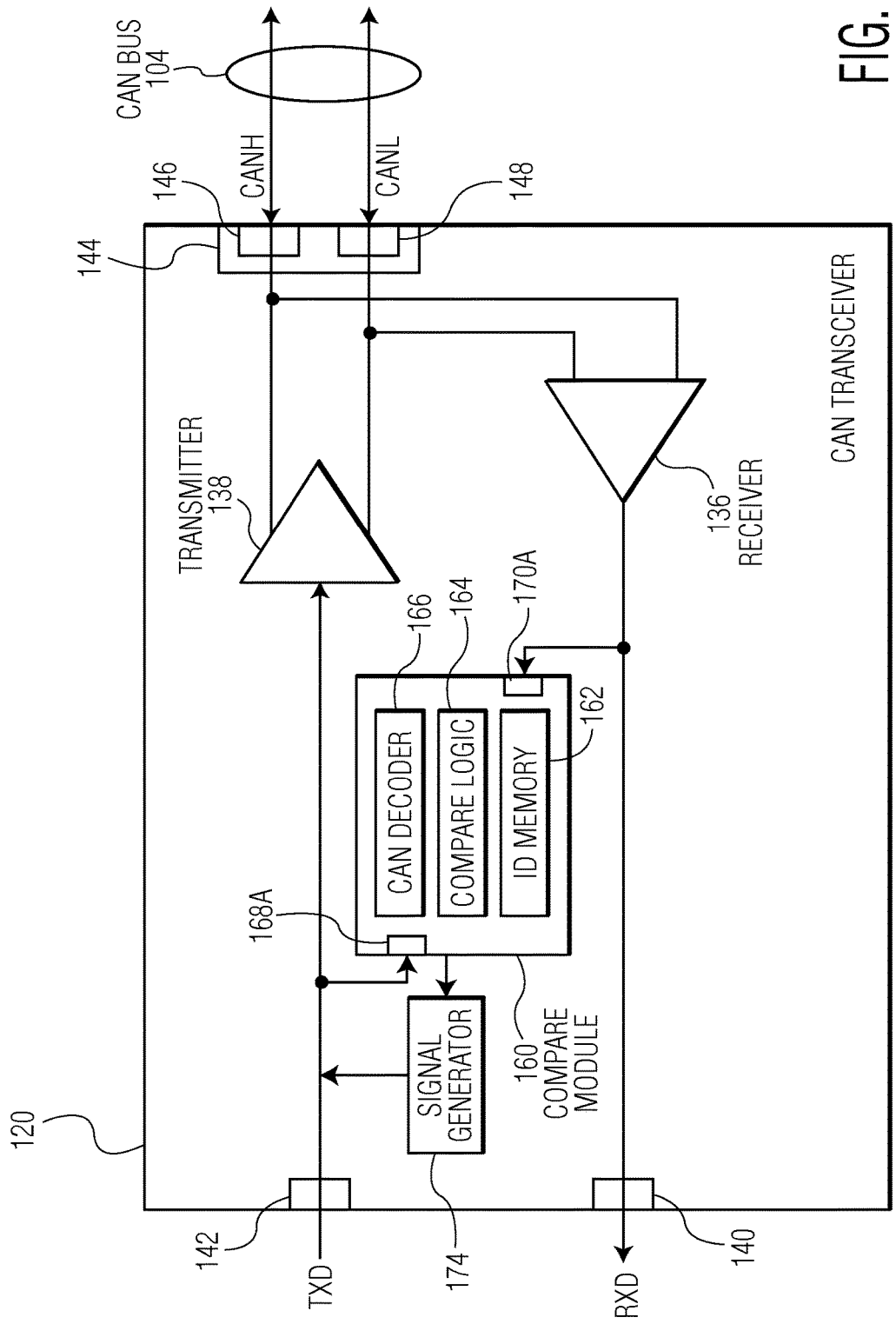
FIG. 7 depicts an embodiment of a compare module integrated into a CAN transceiver.

FIG. 7 depicts an embodiment of how a compare module, such as the compare module 160 described with reference to FIGS. 5 and 6, can be integrated into a CAN transceiver 120. The CAN transceiver 120 includes a receiver 136, a transmitter 138, an RXD interface 140, a TXD interface 142, and a CAN bus interface 144 having a CANH bus interface 146 and a CANL bus interface 148. Incoming CAN traffic (e.g., RXD) that is received at the CAN bus interface is passed to the RXD interface 140 via the receiver and outgoing CAN traffic (e.g., TXD) that is received at the TXD interface 142 is transmitted out the CAN bus interface via the transmitter. As shown in FIG. 7, the RXD input interface 170A of the compare module is connected to the RXD path and the TXD input interface 168A of the compare module is connected to the TXD path. In the embodiment of FIG. 7, the CAN transceiver also includes a signal generator 174 that is configured to generate a signal, such as an error flag, for transmission on the CAN bus 104. In an embodiment, the CAN transceiver is a discrete stand alone integrated circuit (IC) device that can be connected to a microcontroller IC device on a printed circuit board (PCB).

In operation, the identifier memory 162 is populated via the TXD path and identifiers on the RXD path from received CAN messages are decoded by the CAN decoder 166 and checked by the compare logic 164. If a match signal is generated in response to a comparison of an identifier to a stored identifier by the compare logic, the match signal is provided to the signal generator 174, which is configured to generate an error flag or some other error signal that is transmitted onto the CAN bus via the TXD path to invalidate, destroy, and/or kill the incoming CAN message. Although not shown in FIGS. 6 and 7, in some embodiments, the signal generator is part of the compare module and in other embodiments the signal generator is separate from the compare module. In an embodiment, hardware circuits to implement the compare module and the signal generator are fabricated on the same substrate as the circuits to implement the CAN transceiver and these circuits are packaged into a single IC device to provide a single chip security solution.

Figure 8:
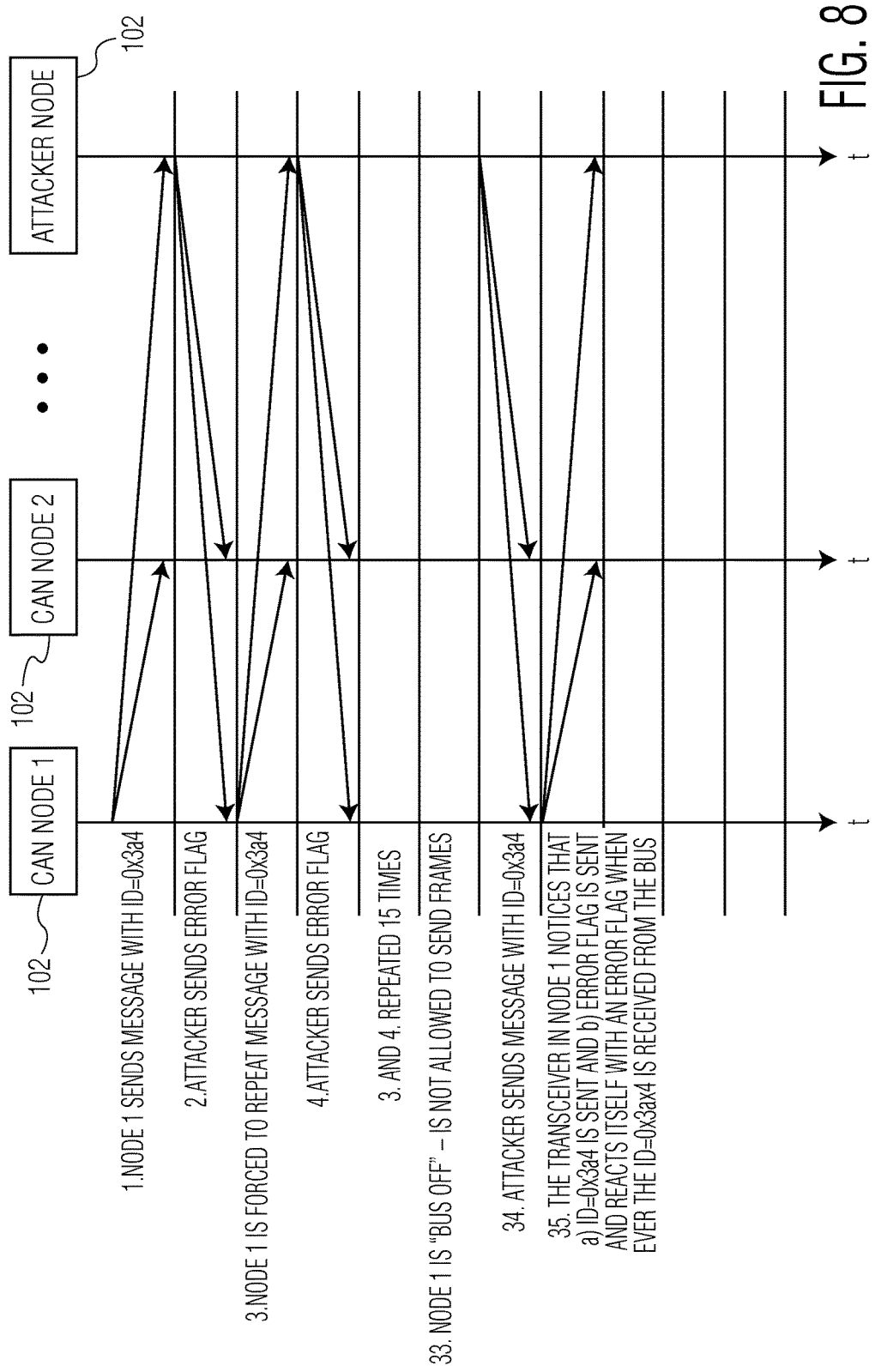
FIG. 8 is a signal timeline of message and signal traffic between CAN nodes and an attacker node that illustrates a first intrusion detection/prevention scenario.

As described above, including a compare module in a CAN node enables the CAN node to implement intrusion detection/protection. Two scenarios for implementing intrusion detection/protection using a compare module are described below with reference to FIGS. 8 and 9. FIG. 8 is a signal timeline of message and signal traffic between CAN nodes 102 (CAN nodes 1 and 2 and an attacker node) that illustrates a first intrusion detection/prevention scenario. In the example of FIG. 8, CAN node 1 is configured with a compare module (not shown) that stores only a single identifier. At time 1, CAN node 1 sends a CAN message with ID=0x3a4 onto the CAN bus and the identifier is stored in the identifier memory. At time 2, the attacker node sends an error flag. At time 3, CAN node 1 is forced to send another CAN message with ID=0x3a4 (because of the error flag at time 2) and at time 4 the attacker node sends another error flag. As dictated by the CAN protocol, the operations at times 3 and 4 are repeated fifteen more times at times 5-32. At time 33, CAN node 1 goes into a "bus off" state, in which the CAN node is no longer allowed to send CAN messages as specified by the CAN protocol. At time 34, the attacker node sends a CAN message with ID=0x3a4 to try to infiltrate the CAN network. However, at time 35, CAN node 1, which is equipped with a compare module as described above, produces a match signal when the identifier of the received CAN message matches a stored identifier and the CAN node takes an action to invalidate, destroy, and/or kill the CAN message. For example, in response to the match signal, CAN node 1 generates an error flag (e.g., via a signal generator

174 such as that shown in FIG. 7) and transmits the error flag onto the CAN bus. The error flag causes CAN node 1 and the other CAN nodes on the CAN bus (e.g., CAN node 2) to invalidate the suspicious CAN message before the corresponding hosts are notified of the CAN message. Invalidating the suspicious CAN message before the hosts are notified prevents a corresponding message from being passed to the hosts to implement malicious activity at the corresponding CAN nodes.

Figure 9:
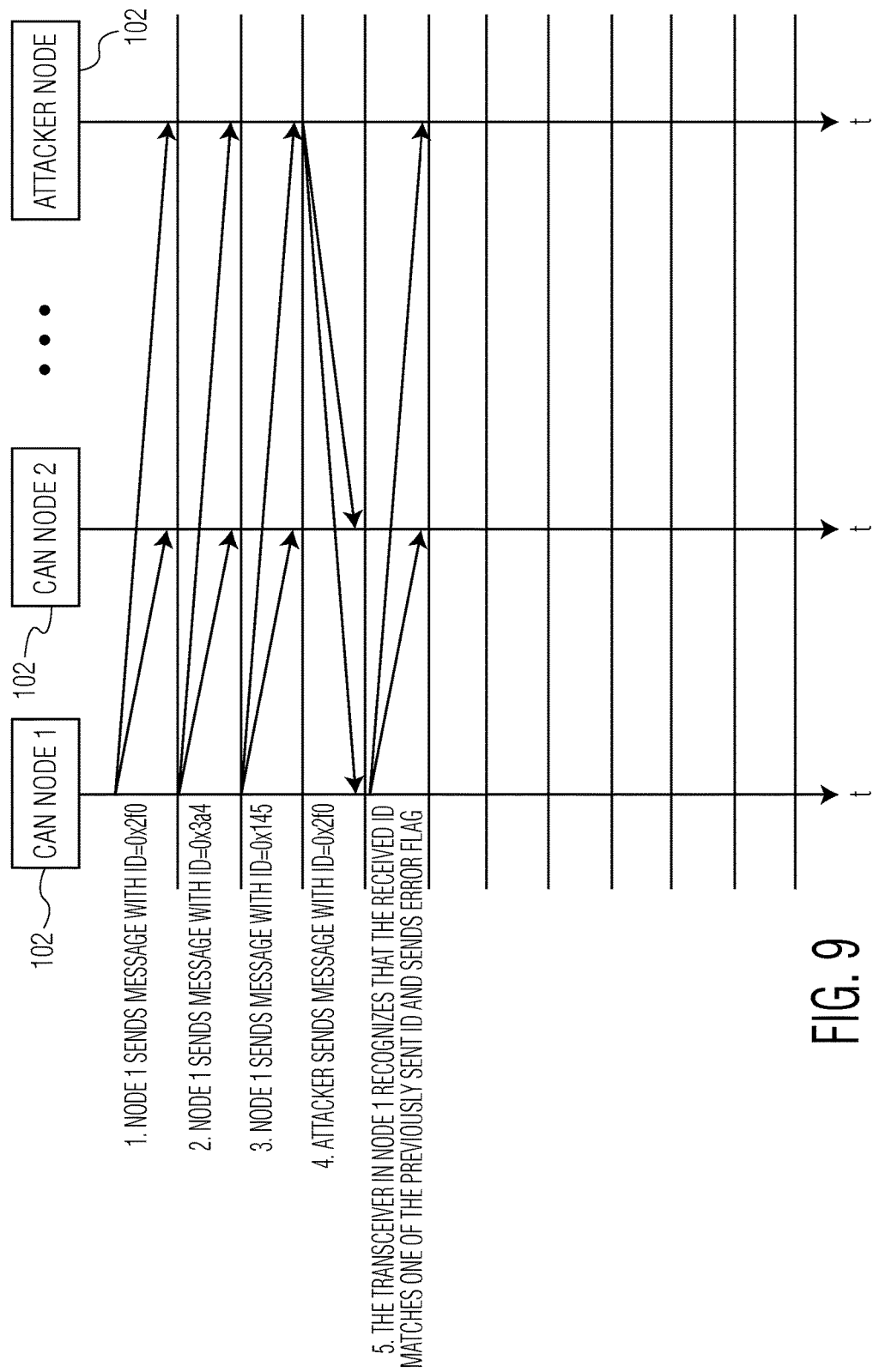
FIG. 9 is a signal timeline of message and signal traffic between CAN nodes and an attacker node that illustrates a second intrusion detection/prevention scenario.

FIG. 9 is a signal timeline of message and signal traffic between CAN nodes (CAN nodes 1 and 2 and an attacker node) that illustrates a second intrusion detection/prevention scenario. In the example of FIG. 9, CAN node 1 is configured with a compare module (not shown) that stores multiple identifiers. At time 1, CAN node 1 sends a CAN message with ID=0x2f0 onto the CAN bus, at time 2, CAN node 1 sends a CAN message with ID=0x3a4 onto the CAN bus, and at time 3, CAN node 1 sends a CAN message with ID=0x145 onto the CAN bus. In an embodiment, each time a CAN message is sent onto the CAN bus, the identifier of the CAN message is decoded by the compare module of the sending CAN node and the new identifier is added to the identifier memory. In the example of FIG. 9, the identifier module is populated with three different identifiers (e.g., identifiers 0x2f0, 0x3a4, and 0x145). At time 4, the attacker node sends a CAN message with ID=0x2f0 to try to infiltrate the CAN network. However at time 5, CAN node 1, which is equipped with a compare module as described above, produces a match signal when the identifier of the received CAN message matches a stored identifier and the CAN node takes action to invalidate, destroy, and/or kill the CAN message on the CAN bus. For example, in response to the match signal, CAN node 1 generates an error flag (e.g., via a signal generator 174 such as that shown in FIG. 7) and transmits the error flag onto the CAN bus. The error flag causes CAN node 1 and the other CAN nodes on the CAN bus (e.g., CAN node 2) to invalidate the suspicious CAN message before the corresponding hosts are notified of the CAN message. Invalidating the suspicious CAN message before the hosts are notified prevents a corresponding message from being passed to the hosts to implement malicious activity at the corresponding CAN nodes.

Example use cases of the above-described intrusion detection prevention technique are described below with reference to FIGS. 10A-10G.

Figure 10A:
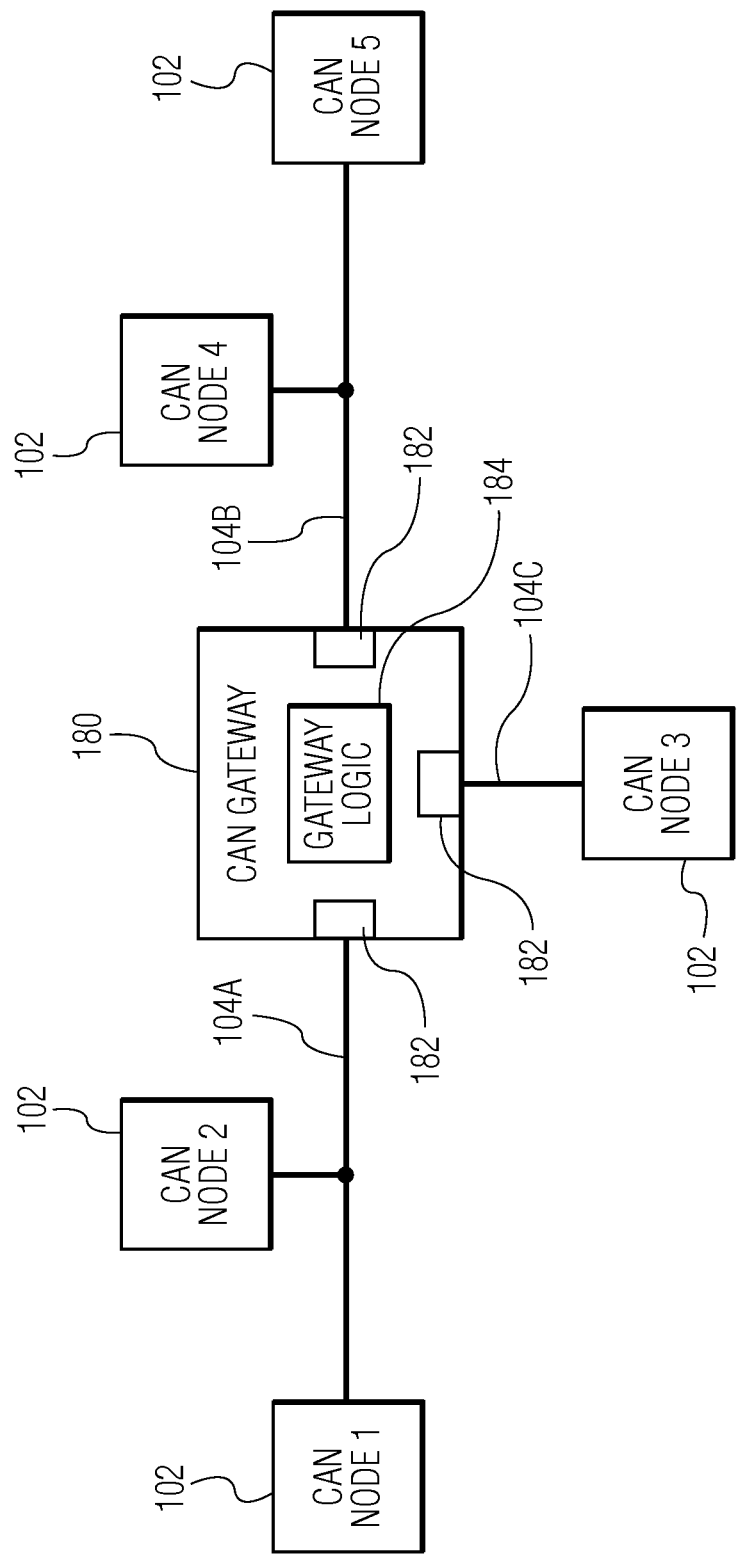
FIG. 10A depicts a CAN network that includes CAN nodes, CAN buses, and a CAN gateway.

FIG. 10A depicts a CAN network 100 that includes CAN nodes 102 (CAN nodes 1-5), CAN buses 104A, 104B, and 104C, and a CAN gateway 180. The CAN nodes and CAN buses are similar to, or the same as, those described above, and the CAN gateway includes CAN transceivers 182 and gateway logic 184 to bridge CAN traffic between the different CAN buses (e.g., CAN bus 104A, CAN bus 104B, and CAN bus 104C). Additionally, although not shown in the examples of FIGS. 10A-10G, at least CAN node 1 is equipped with a compare module 160 and a signal generator 174 to implement the intrusion detection/prevention technique as described herein. The CAN gateway may also include a compare module and a signal generator as described below.

Figure 10B:
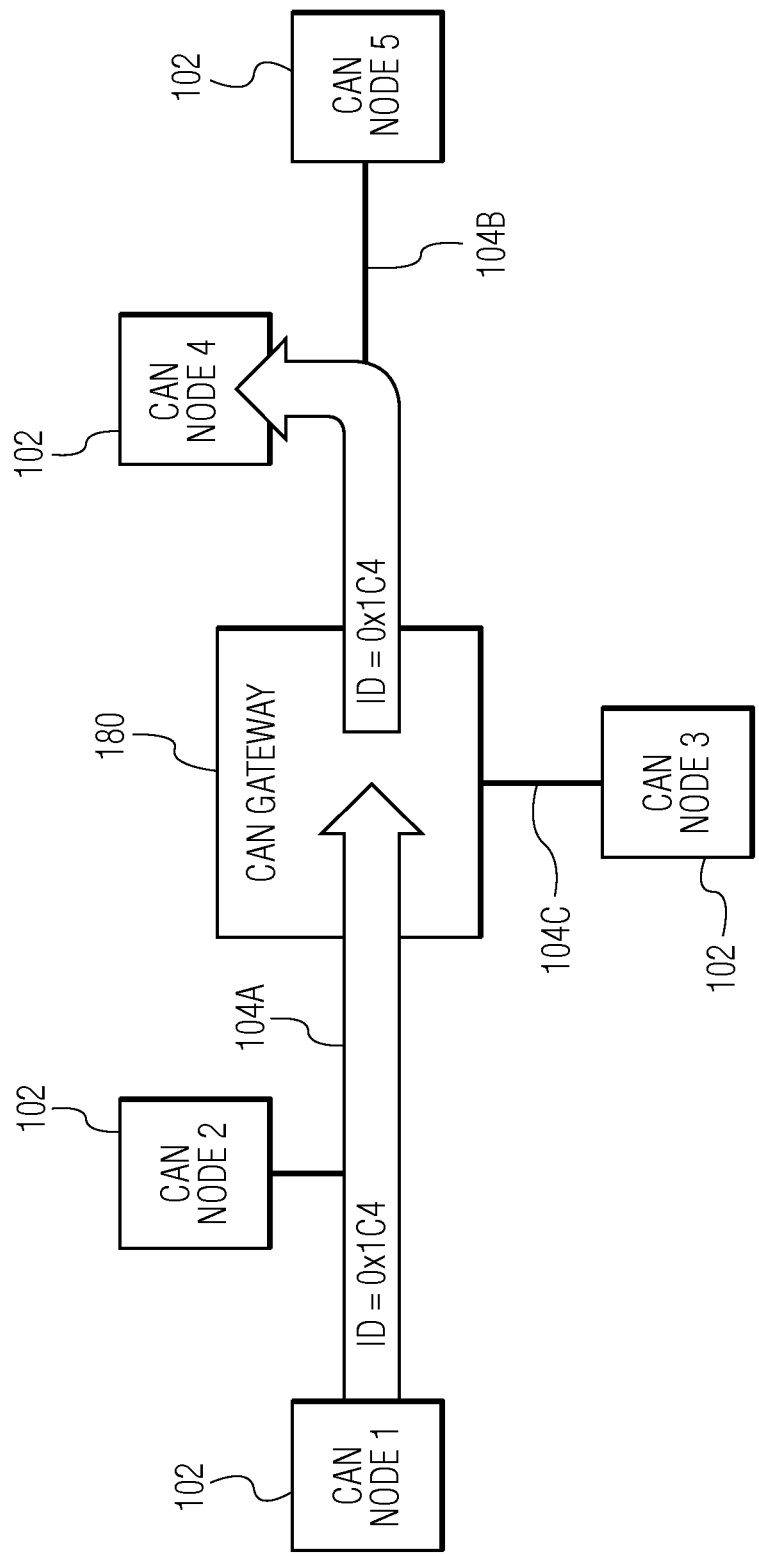
FIG. 10B illustrates a scenario in which CAN node 1 sends a CAN message with identifier ID=0x1C4 onto the CAN network.

FIG. 10B illustrates a scenario in which CAN node 1 sends a CAN message with identifier ID=0x1C4 onto the CAN network. As illustrated, the CAN message is relayed by the CAN gateway to CAN bus 104B and the CAN message is received at CAN node 4. FIG. 10B illustrates a typical operation of a CAN network. As is known in the field of CAN networking, an identifier is unique to a CAN node and therefore, CAN node 1 should be the only CAN node sending CAN messages using the identifier ID=0x1C4. If CAN node 4 is configured to receive CAN messages with identifier ID=0x1C4, then such messages will be received and passed to the host.

Figure 10C:
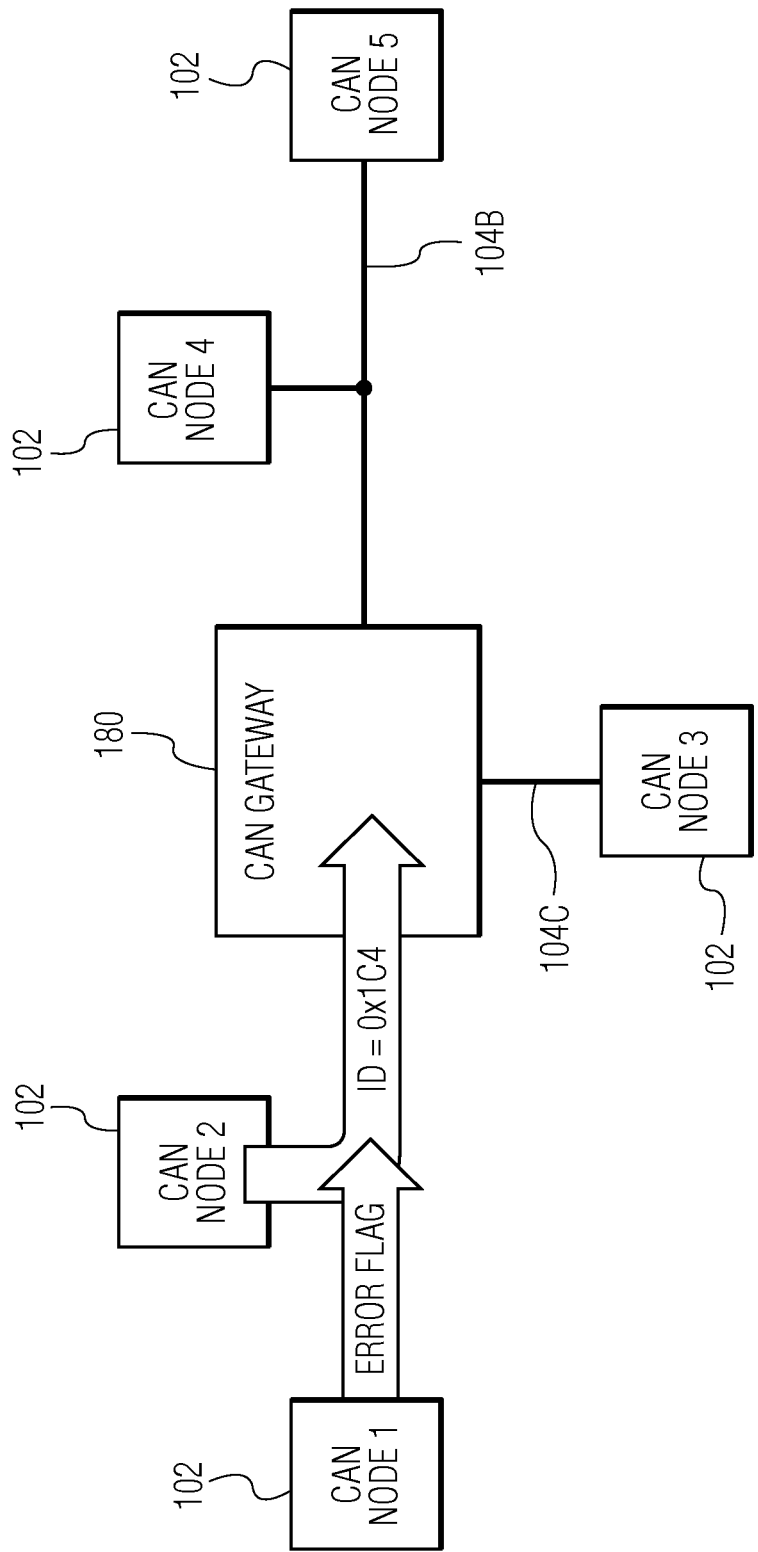
FIG. 10C illustrates a scenario in which CAN node 2 is infiltrated and forced to send a CAN message with identifier ID=0x1C4 onto the CAN network.

FIG. 10C illustrates a scenario in which CAN node 2 is infiltrated and forced to send a CAN message with identifier ID=0x1C4 onto the CAN network. Sending a CAN message from CAN node 2 with this known identifier could allow the infiltrated CAN node to implement malicious activity within other CAN nodes on the CAN bus. As described with reference to FIG. 10B, CAN node 1 is already using identifier ID=0x1C4 and thus, when the suspicious CAN message is received at CAN node 1, the compare module of CAN node 1 will find a match between the identifier of the received CAN message and the stored identifier. In response to the match, the compare module will output a match signal and the match signal triggers the transmission of an error flag onto the CAN bus. The error flag will invalidate, destroy, and/or kill the suspicious CAN message on the CAN bus, thereby protecting the CAN nodes from the suspicious CAN message.

Figure 10D:
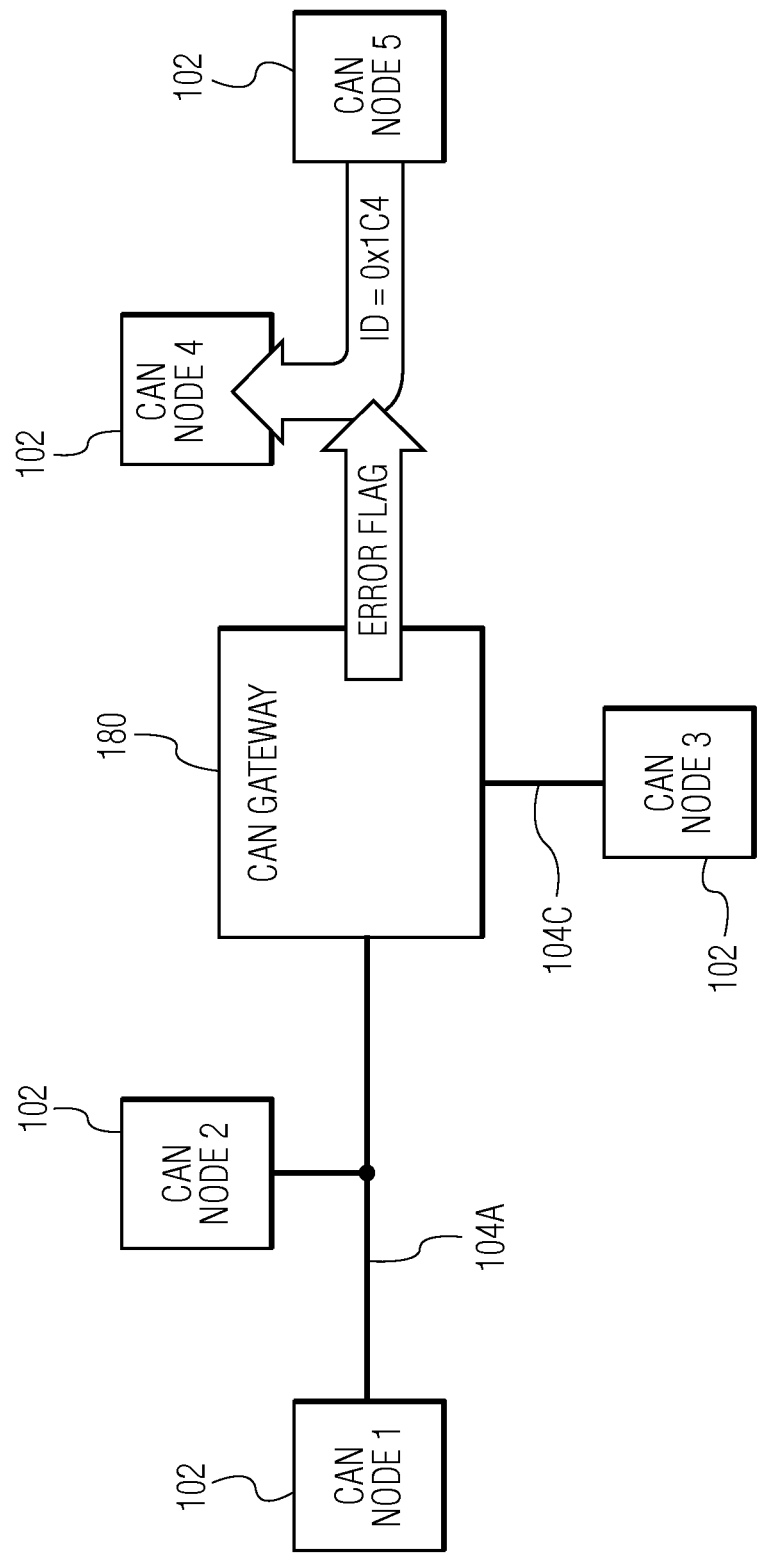
FIG. 10D illustrates a scenario in which CAN node 5 is infiltrated and forced to send a CAN message with identifier ID=0x1C4 onto the CAN network.

FIG. 10D illustrates a scenario in which CAN node 5 is infiltrated and forced to send a CAN message with identifier ID=0x1C4. Sending a CAN message with the known identifier of CAN node 1 could allow the infiltrated CAN node to implement malicious activity within CAN nodes on the CAN bus. However, in this case, the CAN gateway is configured to implement intrusion detection/prevention such as that described above. For example, the CAN gateway is configured with CAN interfaces that include a transceiver, a compare module, and a signal generator as described above with reference to FIGS. 5-9. In an embodiment, the CAN interfaces of the CAN gateway are configured to include an identifier memory that is populated with identifiers received from CAN nodes 1, 2, and 3. Given such a configuration, the CAN gateway decodes the identifier of the CAN message that is sent from CAN node 5 and compares the decoded identifier with the stored identifiers. In this case, the decoded identifier of ID=0x1C4 matches with an identifier stored in the identifier memory of the CAN gateway and a match signal is output. In response to the match signal, the CAN gateway generates an error flag that is output at least from the CAN interface on which the suspicious message was received. In an embodiment, CAN node 5 (the infiltrated CAN node) resends the suspicious message sixteen more times and then enters a bus off state. Once the infiltrated CAN node (CAN node 5) enters the bus off state, the attack is effectively prevented.

Figure 10E:
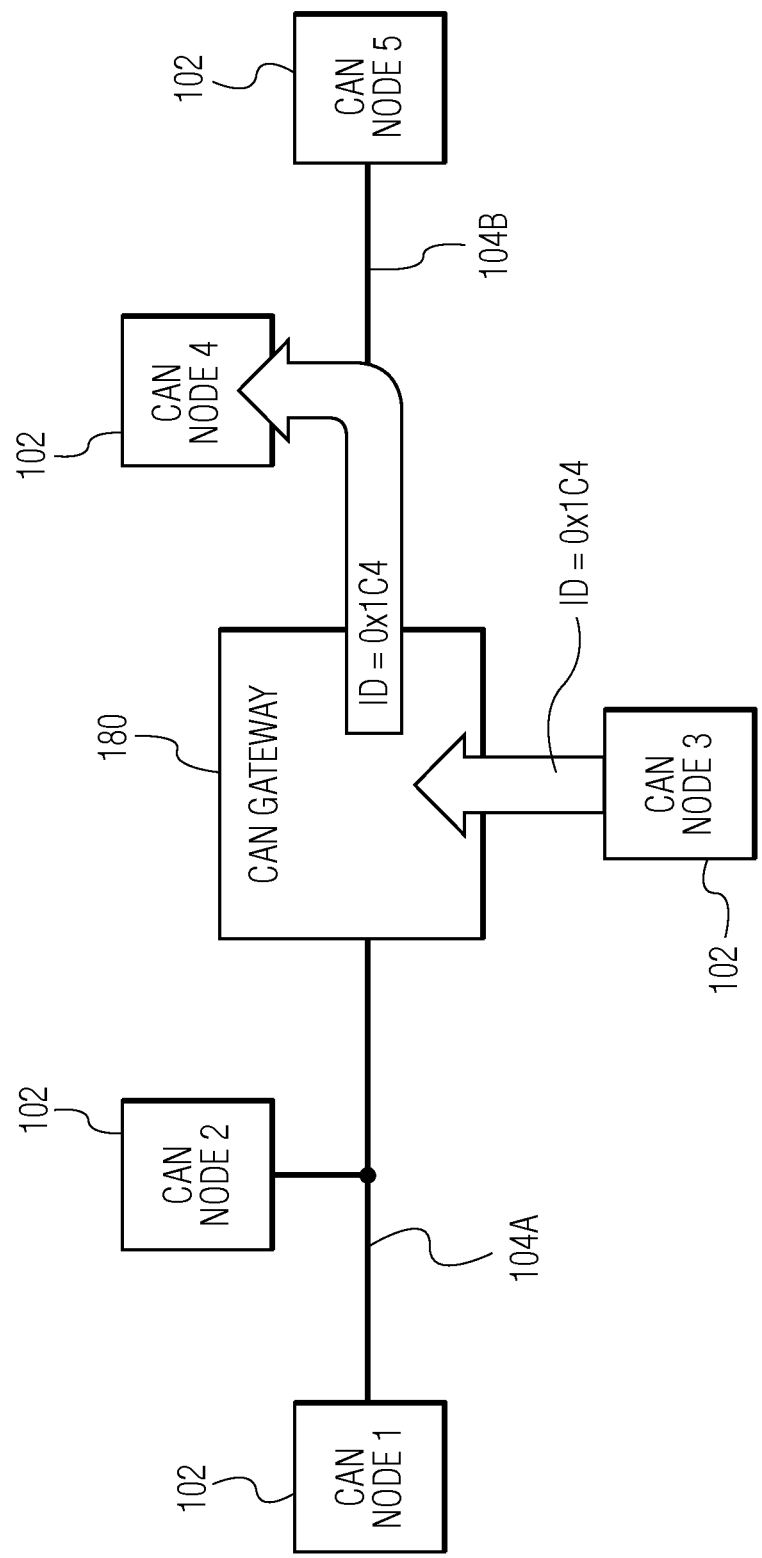
FIG. 10E illustrates a scenario in which CAN node 3 is infiltrated and forced to send a CAN message with identifier ID=0x1C4 onto the CAN network.

FIG. 10E illustrates a scenario in which CAN node 3 is infiltrated and forced to send a CAN message with identifier ID=0x1C4. In this scenario, if the CAN gateway is not equipped with intrusion detection/prevention capability and if the CAN gateway only forwards the CAN message to the CAN bus that includes CAN nodes 4 and 5, then it is possible that CAN nodes 4 and 5 could be compromised.

Figure 10F:
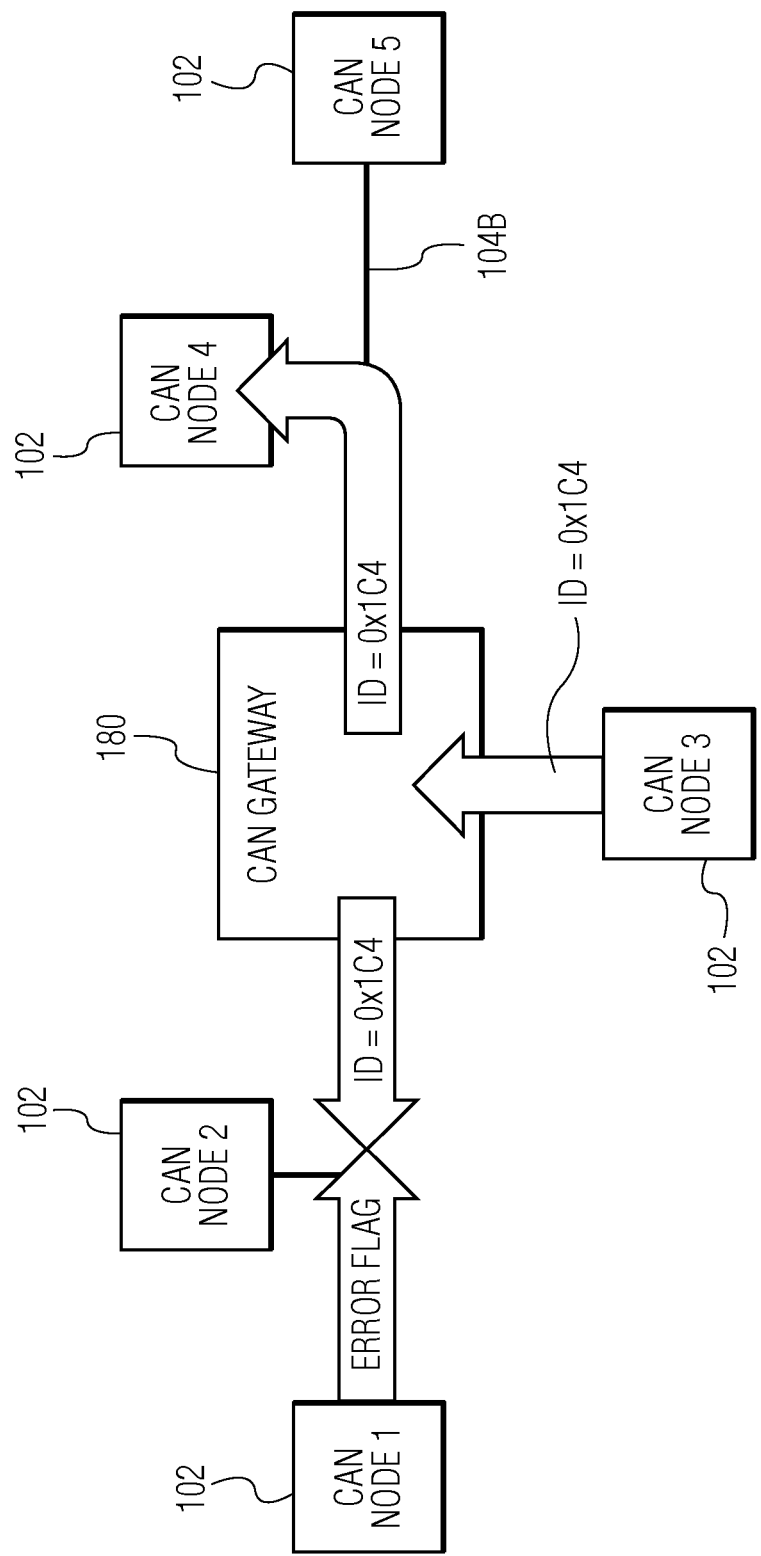
FIG. 10F illustrates a scenario in which CAN node 3 is infiltrated and forced to send a CAN message with identifier ID=0x1C4 onto the CAN network.

FIG. 10F illustrates a scenario in which CAN node 3 is infiltrated and forced to send a CAN message with identifier ID=0x1C4 onto the CAN network. However, as opposed to the scenario of FIG. 10E, the CAN gateway is configured to forward the CAN message from CAN node 3 to all ports of the CAN gateway (e.g., "floods" the CAN message). In particular, the suspicious CAN message is sent to the CAN bus 104B that includes CAN nodes 4 and 5 as well as to the CAN bus 104A that includes CAN nodes 1 and 2. When CAN node 1 receives the suspicious CAN message, the compare module will find a match and issue a match signal, which in turn triggers the generation of an error flag at CAN node 1. Thus, such an attack on CAN node 3 can at least be detected. The CAN gateway will bridge the error flag to CAN bus 104B and CAN bus 104C, but in an embodiment, the gateway is configured to enter the bus off state on CAN bus 104A.

Figure 10G:
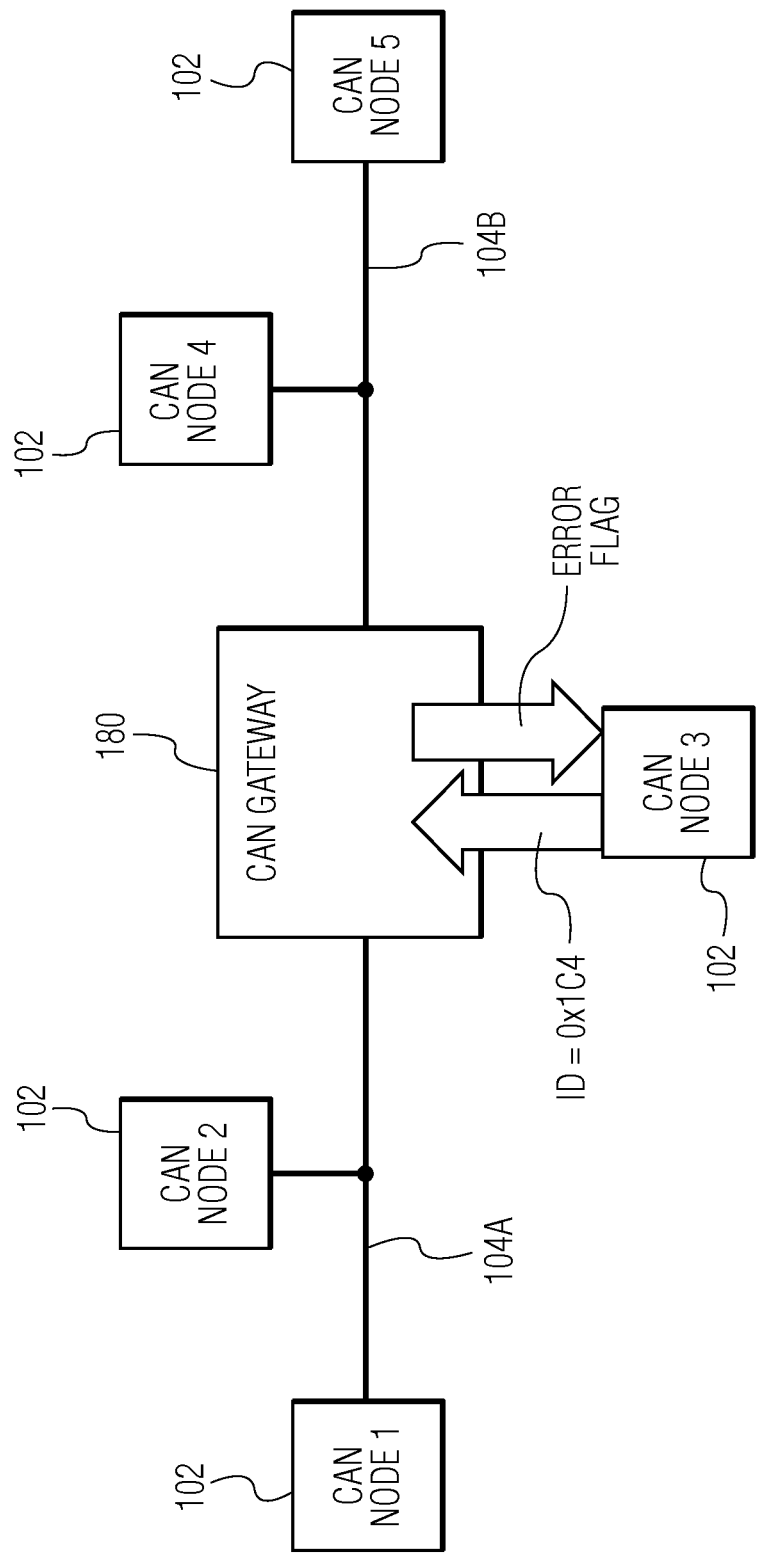
FIG. 10G illustrates a scenario in which the CAN gateway is configured with CAN interfaces that include a compare module and signal generator.

FIG. 10G illustrates a scenario in which the CAN gateway is configured with CAN interfaces that include a compare module and signal generator. In this scenario, CAN node 3 is infiltrated and forced to send a CAN message with identifier ID=0x1C4. The CAN gateway includes a compare module having an identifier memory that stores identifiers that are received from other attached CAN buses. If a received identifier matches a stored identifier, a match signal is issued, which triggers the generation of an error flag. As described above, repeated sending of an error flag eventually causes the infiltrated CAN node to transition to a bus off state.

As described above with reference to FIGS. 1 and 2, CAN nodes typically include a CAN transceiver, a CAN protocol controller, and a host. Often times the CAN transceiver is embodied as a separate IC device, the CAN protocol controller and host are embodied as a separate microcontroller IC device, and the transceiver IC and the microcontroller are connected to each other by a printed circuit board to form the CAN node. Although one possible level of integration is described, the above-described intrusion detection/prevention technique can be implemented in various different ways. For example, the compare module and signal generator can be integrated with the CAN transceiver, the CAN protocol controller, and the host in different combinations.

Figure 11:
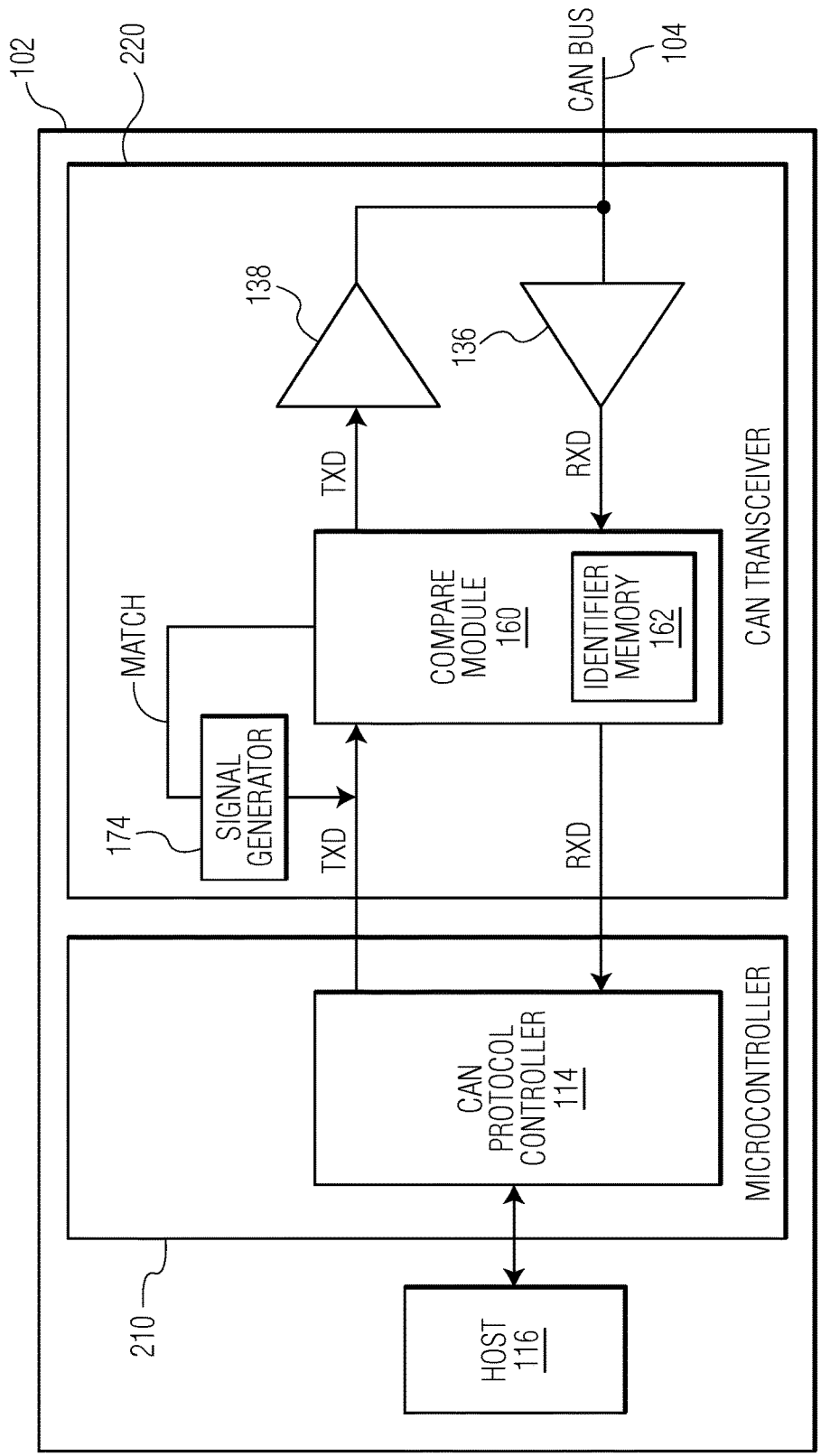
FIG. 11 depicts an embodiment of a CAN node that includes a compare module and a signal generator integrated into a microcontroller IC device.

FIG. 11 depicts an embodiment of a CAN node 102 that includes a CAN transceiver IC device 220, a microcontroller IC device 210, and a separate host 116. In this embodiment, the compare module 160 and signal generator 174 are integrated into the CAN transceiver IC device. As illustrated in FIG. 11, the match signal is used to control the signal generator to generate an error flag on the TXD path. Thus, the above-described intrusion detection/protection technique can be implemented entirely within the CAN transceiver IC device, thereby providing a security solution with a single CAN transceiver IC device or "chip."

Figure 12:
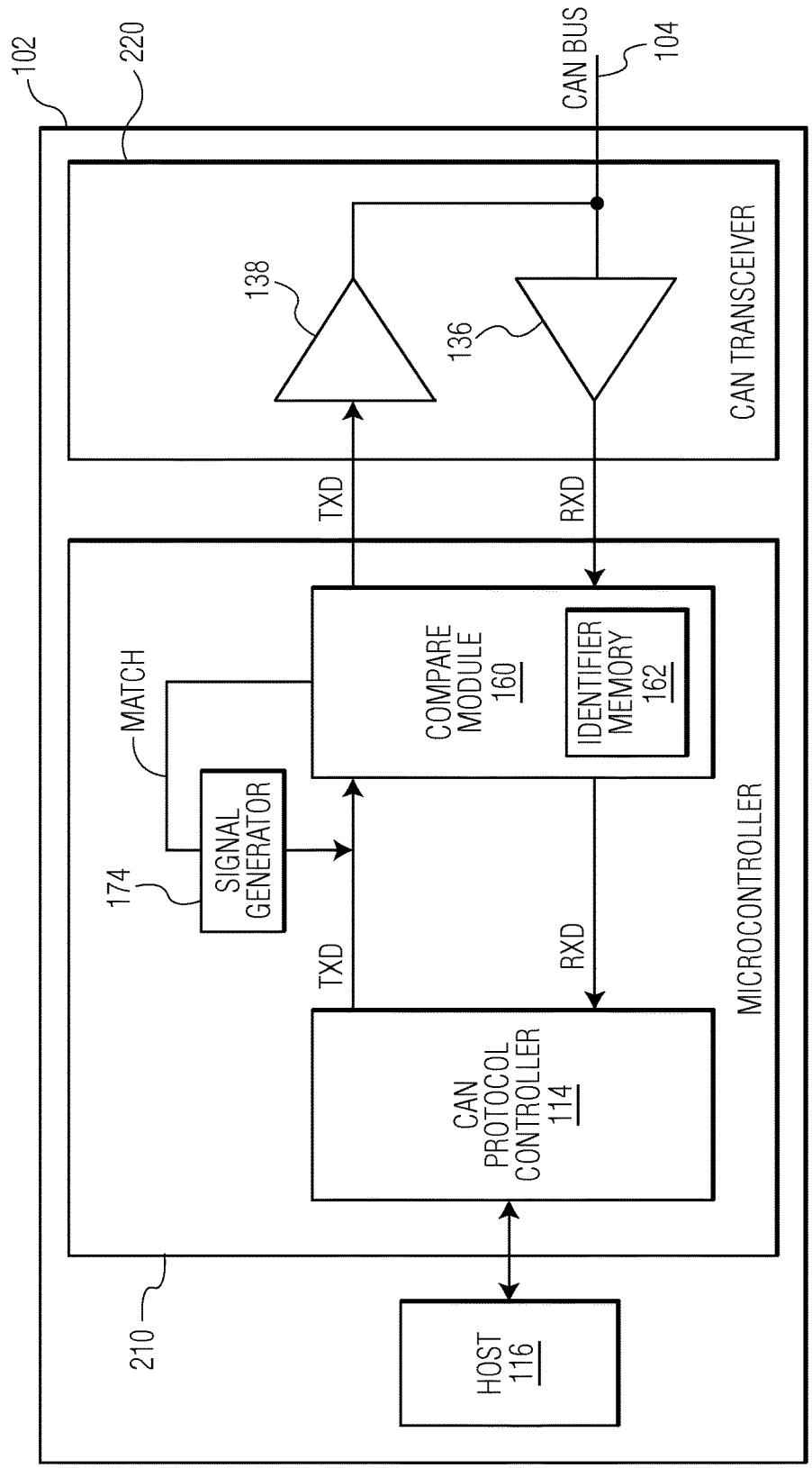
FIG. 12 depicts an embodiment of a CAN node that includes a compare module and a signal generator integrated into a microcontroller IC device.

FIG. 12 depicts an embodiment of a CAN node 102 that includes a CAN transceiver IC device 220, a microcontroller IC device 210, and a separate host 116. The compare module 160 and signal generator 174 are integrated into the microcontroller IC device. As illustrated in FIG. 12, the match signal is used to control the signal generator to generate an error flag on the TXD path. Thus, the above-described intrusion detection/prevention technique can be implemented entirely within the microcontroller IC device, thereby providing a security solution with a single microcontroller IC device or "chip."

Figure 13:
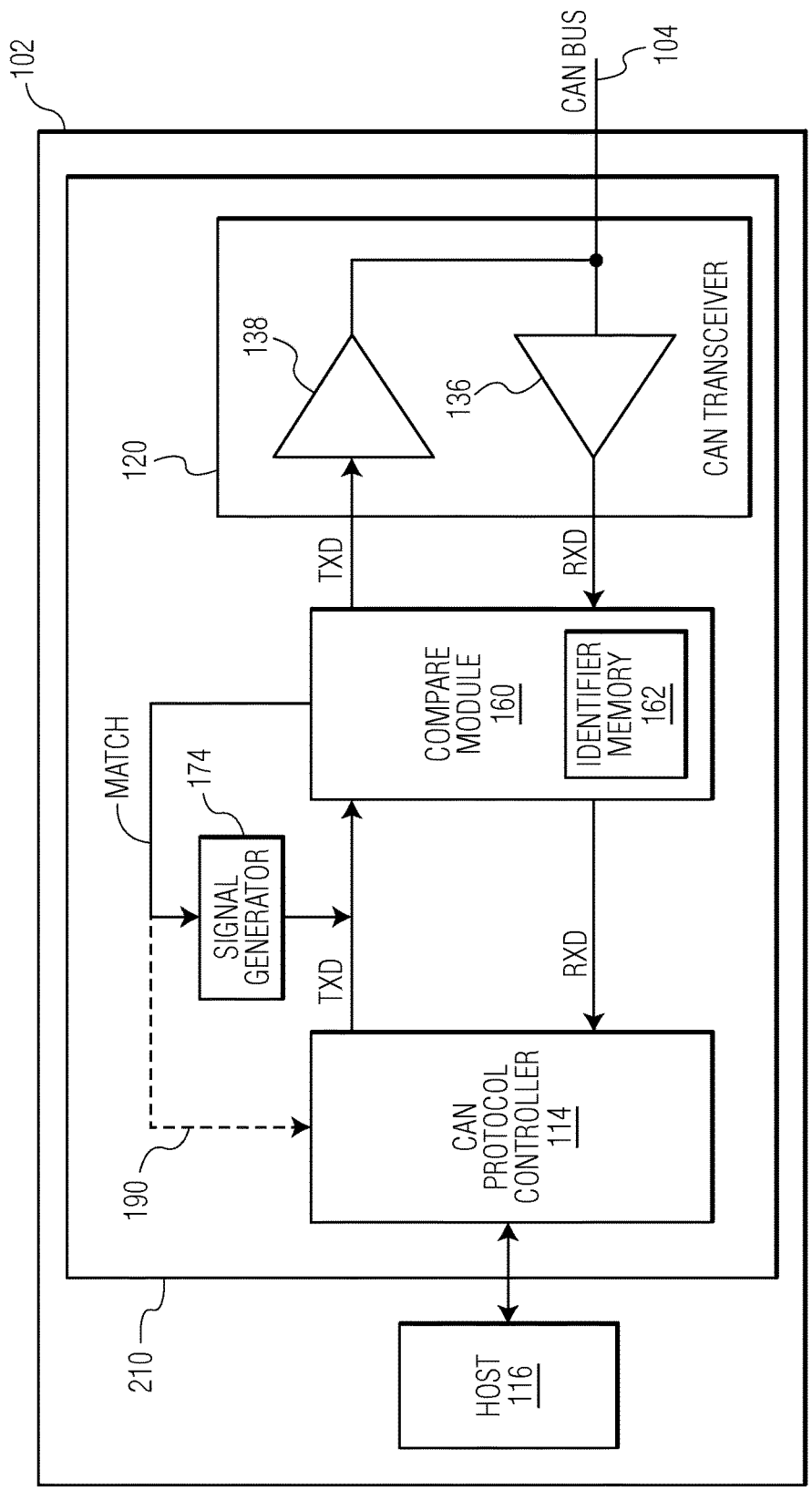
FIG. 13 depicts an embodiment of a CAN node in which a CAN transceiver, a CAN protocol controller, a compare module, and a signal generator are integrated into a single IC device.

FIG. 13 depicts an embodiment of a CAN node 102 in which the CAN transceiver 120 and the CAN protocol controller 114 are included on a single microcontroller IC device 210. In this embodiment, the compare module 160 and signal generator 174 are also integrated into the same IC device. As illustrated in FIG. 13, the match signal is used to control the signal generator to generate an error flag on the TXD path. Thus, the above-described intrusion detection/ protection technique can be implemented entirely within a single microcontroller IC device, thereby providing a security solution with a single IC device or "chip." In an alternative embodiment as indicated by the dashed line 190, the match signal could be provided to the CAN protocol controller to trigger operations within the protocol controller. In one embodiment, the match signal triggers the protocol controller to generate an error flag and output the error flag onto the TXD path, in which case a separate signal generator is not needed. In another embodiment, the match signal still triggers the signal generator to generate the error flag, but additionally the match signal is provided to the CAN protocol controller so that the protocol controller can locally invalidate the incoming suspicious CAN message before the message is passed to the host. In another alternative embodiment, there is no extra signal generator and the match signal is provided to the CAN protocol controller, which generates an error flag in response to the match signal.

Figure 14:
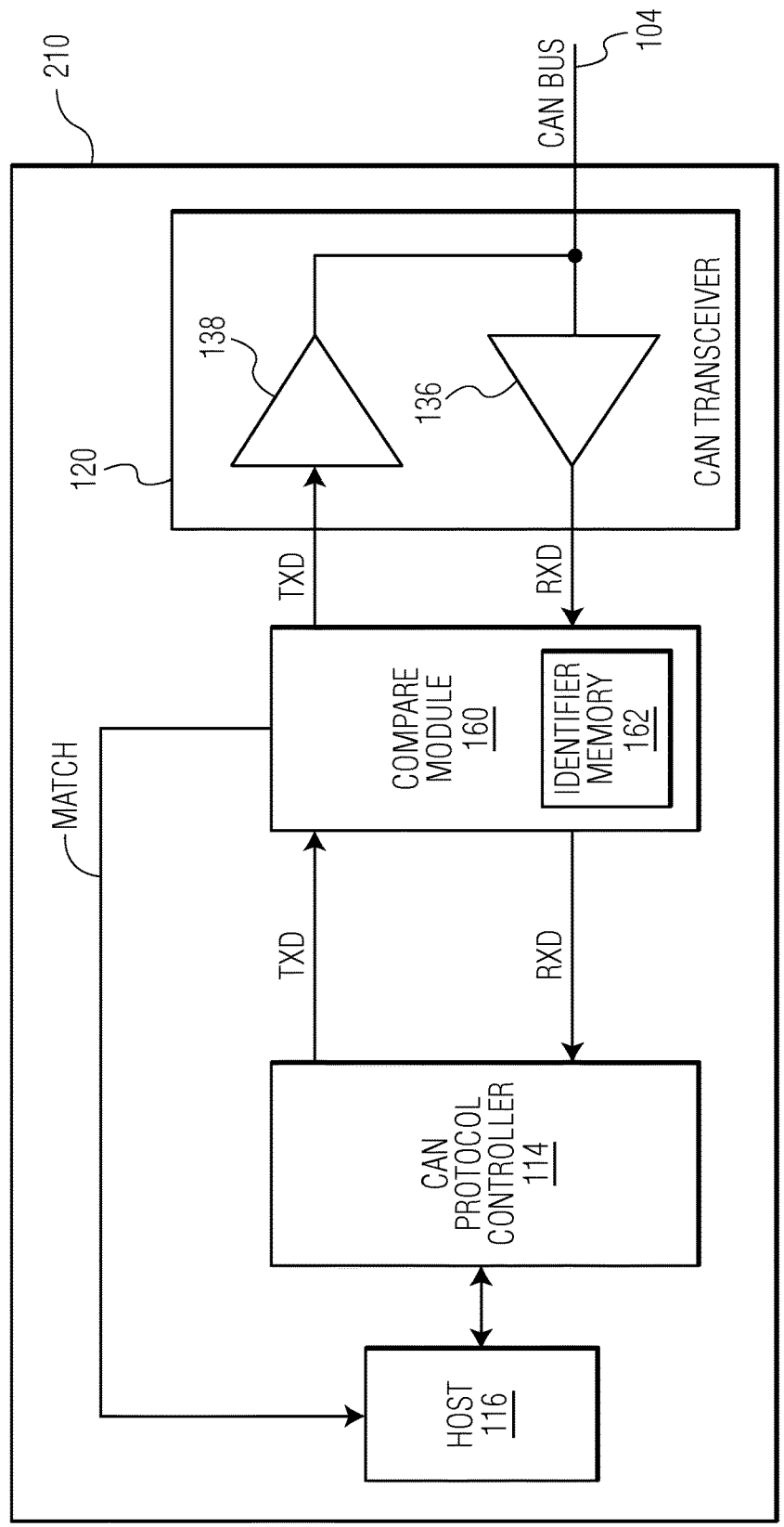
FIG. 14 depicts an embodiment of a CAN node in which a CAN transceiver, a CAN protocol controller, a host, and a compare module are integrated into a single IC device.

FIG. 14 depicts an embodiment of a CAN node in which the CAN transceiver 120, the CAN protocol controller 114, and the host 116 are included on a single microcontroller IC device 210, which microcontroller IC device constitutes a CAN node. In this embodiment, the compare module 160 is also integrated into the same microcontroller IC device. As illustrated in FIG. 14, the match signal is sent to the host, which can then use the match signal to implement a desired action. For example, the host can signal the CAN protocol controller to generate an error flag that is output onto the CAN bus and to invalidate the incoming suspicious CAN message. Thus, the above-described intrusion detection/ protection technique can be implemented entirely within a single IC device or "chip." In an alternative embodiment, the match signal could also be provided to the CAN protocol controller and/or to a signal generator (not shown) as described with reference to FIGS. 7 and 11-13. Although some example configurations are shown, other configurations are possible.

Figure 15:
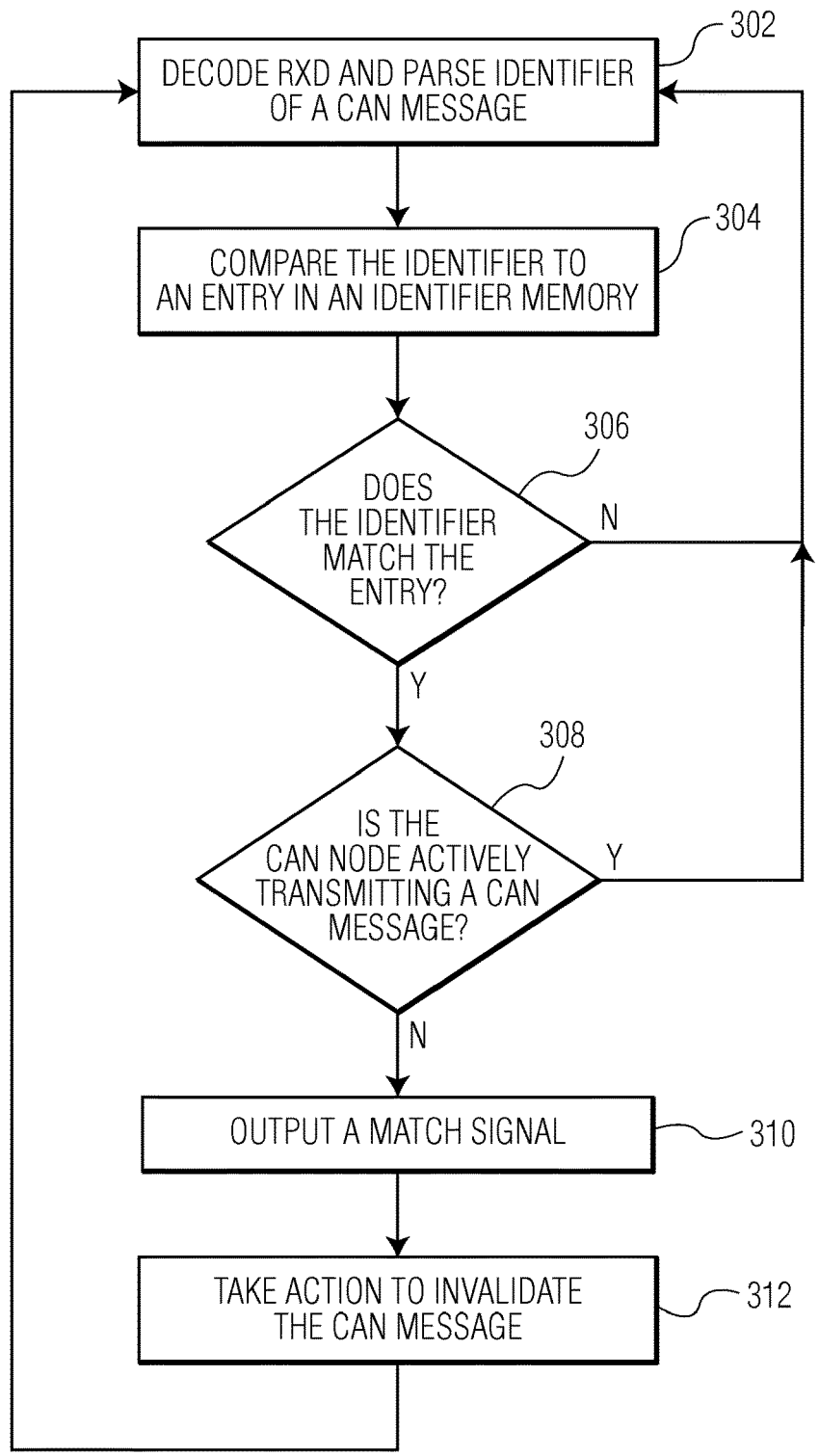
FIG. 15 is a process flow diagram of a technique for implementing intrusion detection/prevention in a CAN network.

FIG. 15 is a process flow diagram of a technique for implementing intrusion detection/prevention in a CAN network. At block 302, RXD is decoded and the identifier of a CAN message is parsed. In an embodiment, the identifier is received at a CAN device via a CAN bus. At block 304, the identifier is compared to an entry in an identifier memory. At decision point 306, it is determined if there is a match between the identifier and the stored identifier. If there is no match, the process returns to block 302. If there is a match, then at decision point 308, it is determined if the CAN node is actively transmitting. If the CAN node is actively transmitting, then the process returns to block 302. The process returns to block 202 at least because it is assumed that the received identifier is from the CAN message that was sent by the CAN node itself. If the CAN node is not actively transmitting, then at block 310, a match signal is output. At block 312, some action is taken to invalidate the CAN message. For example, an error flag is generated and output onto the CAN bus.

Figure 16:
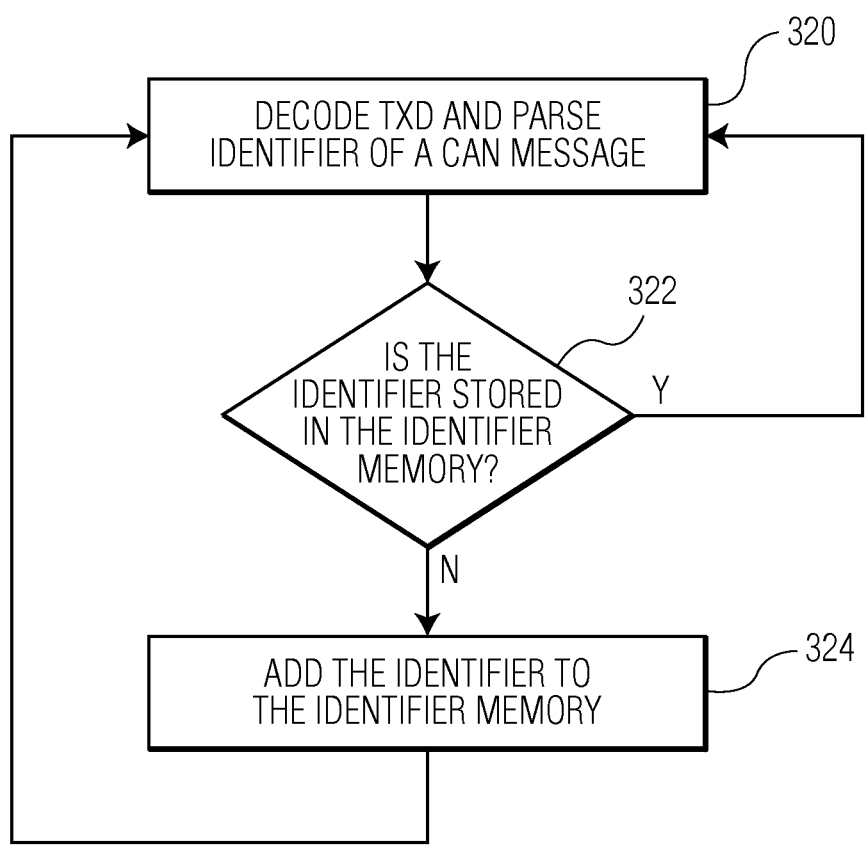
FIG. 16 is a process flow diagram of a technique for populating an identifier memory for implementing intrusion detection/prevention in a CAN network.

FIG. 16 is a process flow diagram of a technique for populating an identifier memory for implementing intrusion detection/prevention in a CAN network. At block 320, TXD is decoded and the identifier of a CAN message is parsed. At decision point 322, it is determined if the identifier is already stored in an identifier memory. If the identifier is already stored in the identifier memory, then the process returns to block 320. If the identifier in not already stored in the identifier memory, then at block 324 the identifier is added to the identifier memory and the process returns to block 320.

In an embodiment, the above-described intrusion detection/prevention techniques can be implemented in a CAN device such as a CAN transceiver IC device, a microcontroller IC device, or an IC device that includes both a CAN transceiver and a microcontroller.

In an embodiment, "CAN messages" refers to CAN "data frames," which are CAN frames with the RTR bit set to "0"

as specified in the CAN protocol. CAN "data frames" are the CAN frames that carry payload data (e.g., in the DATA field) that could be used for malicious intent and thus the CAN "data frames" are important to monitor for intrusion detection/prevention. CAN frames with the RTR bit set to "1" are referred to in the protocol as "remote frames" and such frames do not include payload data because the function of "remote frames" is simply to request transmission of a CAN data frame with the same identifier. Remote frames with the same identifier as a corresponding CAN data frame can be transmitted by all of the other CAN nodes (e.g., all of the CAN nodes other than the CAN node that is in charge of sending the Data Frame with the same identifier). Therefore, it would not make sense to store an identifier of an outgoing CAN remote frame, and it would not make sense to check an incoming CAN remote frame for a matching identifier.

In an embodiment, an error signal may be an active error flag as specified by the CAN protocol or one or more dominant bits in the EOF field, which will cause a format error as specified by the CAN protocol. In an embodiment, a CAN message can be invalidated with an error flag immediately after the identifier has been sent, or at any time later but before the EOF ends. In an embodiment, sending a single dominant bit in the EOF would be sufficient to invalidate a CAN message on the CAN bus. Invalidating a CAN message in the EOF can be beneficial because the CRC has been processed and thus it can be assured that the wrong CAN message (with a corresponding identifier) has not been invalidated, e.g., due to a receive error in the identifier field. Invalidating a CAN message with a few bits, e.g., less than 6 bits which would make an error flag, might also be beneficial.

In some embodiments, a match of all bits of an identifier produces a match signal. In other embodiments, a match of less than all of the bits of an identifier may produce a match signal.

In an embodiment, the above-described intrusion detection/protection technique is applicable to CAN, CAN-FD, and ISO 11898 compliant networks. The intrusion detection/prevention technique is also applicable to other network protocols that are often used in vehicles such as Local Interconnect Network (LIN) and FLEXRAY protocols.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A Controller Area Network (CAN) device comprising:
a compare module configured to interface between a CAN protocol controller and a CAN transceiver, the compare module having;
a receive data (RXD) input interface configured to receive data from the CAN transceiver;
a transmit data (TXD) output interface configured to output data to the CAN transceiver;
a CAN decoder configured to decode an identifier of a CAN message received from the RXD input interface;
an identifier memory configured to store an entry that corresponds to at least one identifier;
compare logic configured to compare a received identifier from a CAN message to the entry that is stored in the identifier memory and to output a match signal when the comparison indicates that the received identifier of the CAN message matches the entry that is stored at the CAN device;
a signal generator configured to interface between the CAN protocol controller and the CAN transceiver and to output, in response to the match signal, a signal on the TXD output interface to invalidate the CAN message, wherein the signal is output from the TXD output interface to the CAN transceiver;
wherein the signal generated by the signal generator comprises one or more dominant bits in the End Of Frame field of the CAN message.

2. The CAN device of claim 1 wherein the signal generator generates an error signal to invalidate the CAN message, wherein the error signal comprises an active error flag as specified by the CAN protocol.

3. The CAN device of claim 1 wherein the identifier memory is configured to store one or more identifiers.

4. The CAN device of claim 1 wherein the identifier memory is configured to store an identifier mask that corresponds to a group of identifiers.

5. The CAN device of claim 1 wherein the compare logic is further configured to output the match signal when both the comparison indicates that the received identifier of the CAN message matches the entry that is stored at the CAN device and the CAN device is not currently transmitting a CAN message with the received identifier.

6. The CAN device of claim 1 wherein the compare module further includes a TXD input interface configured to receive data from a CAN protocol controller and wherein the compare logic is further configured to populate the identifier memory with an identifier of a CAN message received at the TXD input interface.

7. The CAN device of claim 6 wherein an identifier is added to the identifier memory if the identifier is not already stored in the identifier memory.

8. A CAN transceiver integrated circuit device comprising a receiver, a transmitter, a CAN bus interface, an RXD output interface, and the CAN device as recited in claim 1.

9. A microcontroller integrated circuit device comprising the CAN protocol controller and the CAN device as recited in claim 1.

10. An integrated circuit device comprising the CAN transceiver, the CAN protocol controller, and the CAN device as recited in claim 1.

11. A method for controlling Controller Area Network (CAN) traffic, the method comprising:
receiving an identifier of a CAN message at a CAN device that is located on a receive data (RXD) path between a CAN transceiver and a CAN protocol controller, the identifier received at the CAN device via the CAN transceiver and a CAN bus;
comparing the identifier of the CAN message to an entry in an identifier memory at the CAN device;
outputting a match signal when the comparison indicates that the identifier from the CAN message matches the entry in the identifier memory; and
invalidating the CAN message in response to the match signal, wherein invalidating the CAN message in response to the match signal comprises generating a signal that will invalidate the CAN message; and
outputting the signal that will invalidate the CAN message onto a transmit data (TXD) path between the CAN transceiver and the CAN protocol controller such that the signal that will invalidate the CAN message is transmitted onto the CAN bus via the CAN transceiver;
wherein the signal that will invalidate the CAN message comprises one or more dominant bits in the End Of Frame field of the CAN message.

12. The method of claim 11 wherein invalidating the CAN message comprises sending an error signal onto the CAN bus via the CAN transceiver, wherein the error signal comprises an active error flag as specified by the CAN protocol.

13. The method of claim 11 wherein comparing the identifier of the CAN message with an entry in an identifier memory comprises at least one of comparing the identifier to one or more stored identifiers or comparing the identifier memory to a mask that corresponds to a group of identifiers.

14. The method of claim 11 comprising identifying the identifier of a CAN message that is to be transmitted from the CAN device and storing the identifier in an identifier memory at the CAN device.

15. The method of claim 11 comprising an initial step of decoding an identifier of a CAN message from the TXD path and storing the decoded identifier in an identifier memory at the CAN device.

16. The method of claim 14 comprising adding an identifier to the identifier memory if the identifier is from a CAN message that is transmitted from the CAN device and the identifier is not already stored in the identifier memory.

17. The method of claim 11 wherein the identifier of the CAN message is compared with the entry in the identifier memory before the CAN message is provided to a CAN protocol controller.

18. A Controller Area Network (CAN) device comprising:
a CAN transceiver;
a CAN protocol controller; and
a compare module located in a signal path between the CAN transceiver and the CAN protocol controller, the compare module having:
a receive data (RXD) input interface configured to receive data from the CAN transceiver via a CAN bus;
a CAN decoder configured to decode an identifier of a CAN message received from the RXD input interface;
an identifier memory configured to store an entry that corresponds to at least one identifier; and
compare logic configured to compare a received identifier from a CAN message with the entry that is stored in the identifier memory and to output a match signal when the comparison indicates that the received identifier of the CAN message matches the entry that is stored at the CAN device;
a signal generator connected between the CAN protocol controller and the CAN transceiver and configured to output, in response to the match signal, a signal on a transmit data (TXD) path that is located between the CAN transceiver and the CAN protocol controller such that the signal is transmitted on the CAN bus via the CAN transceiver, wherein the signal is configured to invalidate the CAN message;
wherein the signal generated by the signal generator comprises one or more dominant bits in the End Of Frame field of the CAN message.

* * * * *